US011763054B2

(12) United States Patent
Elliott et al.

(10) Patent No.: US 11,763,054 B2
(45) Date of Patent: Sep. 19, 2023

(54) VERIFICATION OF HARDWARE DESIGN FOR INTEGRATED CIRCUIT IMPLEMENTING POLYNOMIAL INPUT VARIABLE FUNCTION

(71) Applicant: Imagination Technologies Limited, Kings Langley (GB)

(72) Inventors: Sam Elliott, London (GB); Robert McKerney, Hemel Hempstead (GB); Max Freiburghaus, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/384,483

(22) Filed: Jul. 23, 2021

(65) Prior Publication Data

US 2021/0350057 A1    Nov. 11, 2021

Related U.S. Application Data

(62) Division of application No. 16/848,934, filed on Apr. 15, 2020, now Pat. No. 11,106,847.

(30) Foreign Application Priority Data

Apr. 15, 2019  (GB) .................................. 1905297

(51) Int. Cl.
*G06F 30/3323* (2020.01)
*G06F 119/16* (2020.01)

(52) U.S. Cl.
CPC ...... *G06F 30/3323* (2020.01); *G06F 2119/16* (2020.01)

(58) Field of Classification Search
USPC ........................................................ 716/107
See application file for complete search history.

(56) References Cited

U.S. PATENT DOCUMENTS

2004/0098682 A1\*  5/2004  Jain .................... G06F 30/3323
                                                      716/103
2004/0246440 A1\*  12/2004  Andino ............ B29D 11/00086
                                                      351/159.74

(Continued)

FOREIGN PATENT DOCUMENTS

EP         3239834 A1    11/2017

OTHER PUBLICATIONS

Harrison; "Floating Point Verification in HOL Light: The Exponential Function"; vol. 1349; pp. 246-260.

(Continued)

*Primary Examiner* — Mohammed Alam
(74) *Attorney, Agent, or Firm* — Potomac Law Group, PLLC; Vincent M DeLuca

(57) ABSTRACT

Methods and systems for verifying a hardware design for an integrated circuit that implements a function that is polynomial in an input variable x over a set of values of x. The method includes formally verifying that a first instantiation of the hardware design implements a function that is polynomial of degree k in x by formally verifying that for all x in the set of values of x the first instantiation of the hardware design has a constant $k^{th}$ difference; and verifying that a second instantiation of the hardware design generates an expected output in response to each of at least k different values of x in the set of values of x.

17 Claims, 6 Drawing Sheets

(56) References Cited

U.S. PATENT DOCUMENTS

| | | | |
|---|---|---|---|
| 2005/0198597 A1* | 9/2005 | Zhu | G06F 11/3608 |
| | | | 716/103 |
| 2013/0019216 A1* | 1/2013 | Vasudevan | G06F 30/3323 |
| | | | 716/106 |
| 2013/0152030 A1* | 6/2013 | Drane | G06F 30/3323 |
| | | | 716/104 |
| 2013/0198705 A1 | 8/2013 | Janssen et al. | |
| 2016/0238481 A1* | 8/2016 | Brandon | G06F 30/15 |
| 2017/0212968 A1* | 7/2017 | Diao | G06F 30/33 |
| 2017/0308355 A1* | 10/2017 | Drane | G06F 7/483 |
| 2018/0293338 A1* | 10/2018 | Braun | G06F 30/20 |
| 2020/0304293 A1* | 9/2020 | Gama | G06F 17/16 |
| 2020/0327270 A1* | 10/2020 | Elliott | G06F 30/3323 |

OTHER PUBLICATIONS

Shekhar et al., "Simulation Bounds for Equivalence Verification of Polynomial Datapaths Using Finite Ring Algebra," EEE Transactions on Very Large Scale Integration (VLSI) Systems, vol. 16, No. 4, Apr. 2008, pp. 376-387.
Note: copy of NPL in parent application).

\* cited by examiner

VERIFICATION OF HARDWARE DESIGN FOR INTEGRATED CIRCUIT IMPLEMENTING POLYNOMIAL INPUT VARIABLE FUNCTION

CROSS-REFERENCE TO RELATED APPLICATIONS AND CLAIM OF PRIORITY

This application is a divisional under 35 U.S.C. 121 of copending application Ser. No. 16/848,934 filed Apr. 15, 2020, which claims foreign priority under 35 U.S.C. 119 from United Kingdom Application No. 1905297.6 filed Apr. 15, 2019.

BACKGROUND

Many electronic devices such as, but not limited to, systems-on-chips (SoCs), include hardware (e.g. an integrated circuit) that implements a function that is polynomial in one or more input variables.

As is known to those of skill in the art, a polynomial is a mathematical expression of one or more terms each of which consists of a constant (which may also be referred to as a coefficient) multiplied by one or more variables (which may also be referred to as indeterminates) raised to a nonnegative integer power. The exponent on a variable in a term is called the degree or order of that variable in that term. The degree or order of the polynomial is the largest degree or order of any one term with a nonzero coefficient. For example, a polynomial $P_x$ in the indeterminate x with degree n is defined in equation (1) wherein $a_0, a_1 \ldots a_n$ are the constants:

$$P_x = a_0 + a_1 x + a_2 x^2 + \ldots + a_n x^n \quad (1)$$

The polynomial of equation (1) can be expressed more concisely using the summation notation shown in equation (2):

$$P_x = \Sigma_{k=0}^{n} a_k x^k \quad (2)$$

A polynomial may have more than one indeterminate. For example, a polynomial $P_{x,y}$ in the indeterminates x and y with degree 2 is defined in equation (3) wherein $a_{0,0}$, $a_{1,0} \ldots a_{0,2}$ are the constants:

$$P_{x,y} = a_{0,0} + a_{1,0} x + a_{0,1} y + a_{1,1} xy + a_{2,0} x^2 + a_{0,2} y^2 \quad (3)$$

A function is polynomial in an input variable if when you fix all the other input variables, the output of the function for that input variable can be determined by evaluating a polynomial. As is known to those of skill in the art, evaluating a polynomial comprises substituting a numerical value for each indeterminate and carrying out the indicated multiplications and additions/subtractions. For example a function $P_x(x)$ which comprises evaluating the polynomial $P_x$ with variable x is a function that is polynomial in x. Similarly, a function $P_{x,y}(x, y)$ which comprises evaluating the polynomial $P_{x,y}$ with variables x and y, is a function that is polynomial in x and y.

Accordingly an integrated circuit that implements a function that is polynomial in one or more input variables is an integrated circuit that is configured to receive one or more input variables and generate an output by evaluating a polynomial in at least one of those variables.

Generating an integrated circuit that implements a function that is polynomial in one or more input variables typically includes developing a hardware design that describes the structure and/or function of an integrated circuit that implements the function; verifying or testing the hardware design to ensure that an integrated circuit manufactured according to the hardware design will behave as expected; and once verified, manufacturing an integrated circuit, at an integrated circuit manufacturing system, in accordance with the hardware design.

Verifying the hardware design for an integrated circuit may comprise verifying that an instantiation of the hardware design will generate an expected output in response to any input in an input domain. The input domain may be all or only a subset of the valid inputs. In some cases, this may comprise verifying that the output of an instantiation of the hardware design in response to each input in an input domain is correct (e.g. that an instantiation of the hardware design for an integrated circuit that implements a function that is polynomial in one or more input variables correctly evaluates the function for any input in an input domain). In other cases, this may alternatively, or additionally comprise, verifying that the hardware design is functionally equivalent to another hardware design. Two hardware designs are said to be functionally equivalent over an input domain if instantiations of the two hardware designs produce the same output as each other in response to any input in the input domain. This type of verification may be used during the design process after an original hardware design is modified to verify that the modified hardware design will produce the same output as the original hardware design.

A hardware design may be verified, for example, by formal verification or simulation-based verification. Formal verification is a systematic process that uses a mathematical model of the hardware design and mathematical reasoning to verify the hardware design. In contrast, simulation-based verification is a process in which a hardware design is tested by applying stimuli to an instantiation of the hardware design and monitoring the output of the instantiation of the hardware design in response to the stimuli.

In formal verification, the hardware design is transformed into a mathematical model (e.g. a state-transition system, or a flow graph) to thereby provide an instantiation of the hardware design which can be tested to verify the hardware design, and formal properties to be verified are expressed using mathematical logic using a precise syntax or a language with a precise mathematical syntax and semantics.

Formal verification is performed using a formal verification tool (i.e. a software tool that is capable of performing formal verification of a hardware design). Formal verification tools include, but are not limited to, formal property checkers (which may also be referred to as formal model checkers) such as OneSpin 360 DV™, Mentor Graphics Questa® Formal Verification, Synopsys® VC Formal, Cadence® Incisive® Enterprise Verifier, and JasperGold®; and formal equivalence checkers such as Synopsys® HECTOR, and other logical equivalence checkers (LECs) and sequential logical equivalence checkers (SLECs)).

Formal verification can improve controllability as compared to simulation-based verification. Low controllability occurs when the number of simulation test signals or vectors required to thoroughly simulate a hardware design becomes unmanageable. For example, a 32-bit comparator requires $2^{64}$ test vectors. This may take millions of years to verify exhaustively by simulation-based verification. By performing formal verification, the 32-bit comparator can be verified in less than a minute.

While formal verification can be an effective method for exhaustively verifying properties of a hardware design, this is only true if the properties that are to be verified are presented in such a manner that a formal verification tool can solve the mathematical problem presented thereby. Specifically, during formal verification of a hardware design the hardware design is represented as a mathematical model, the properties to be verified are also represented mathematically, and mathematical reasoning is used to determine if the properties are true for the hardware design based on the mathematical model. In other words, in formal verification the verification is presented as a mathematical problem to be solved. Some mathematical problems will be solvable within a reasonable amount of time by a formal verification tool whereas others will not. When a formal verification tool is able to solve the mathematical problem presented by the hardware design and the properties to be verified then the formal verification is said to converge. When, however, a formal verification tool is unable to solve the mathematical problem presented by the hardware design and the properties to be verified, then the formal verification does not converge, and no results are output, and the verification is inconclusive.

Known naïve methods for formally verifying that an instantiation of a hardware design for an integrated circuit that implements a function that is polynomial in one or more input variables will generate an expected output in response to any input in an input domain comprise formally verifying, for all inputs, the property that the output of the instantiation matches the output of a model or another hardware design. However, presenting the problem in this naive manner has proved difficult for formal verification tools to solve (i.e. formal verification tools are unable to converge).

The embodiments described below are provided by way of example only and are not limiting of implementations which solve any or all of the disadvantages of known methods and systems for verifying a hardware design for an integrated circuit that implements a function that is polynomial in one or more input variables.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for verifying a hardware design for an integrated circuit that implements a function that is polynomial in an input variable x over a set of values of x. The method includes formally verifying that a first instantiation of the hardware design implements a function that is polynomial of degree k in x by formally verifying that for all x in the set of values of x the first instantiation of the hardware design has a constant $k^{th}$ difference; and verifying that a second instantiation of the hardware design generates an expected output in response to each of at least k different values of x in the set of values of x.

A first aspect provides a computer-implemented method of verifying a hardware design for an integrated circuit that implements a function that is polynomial of degree k in an input variable x over a set of values of x, k being an integer greater than or equal to one, the method comprising in one or more processors: formally verifying that a first instantiation of the hardware design implements a function that is polynomial of degree k in x by formally verifying that for all values of x in the set of values of x the first instantiation of the hardware design has a constant $k^{th}$ difference; and verifying that a second instantiation of the hardware design generates an expected output in response to each of at least k different values of x in the set of values of x.

A second aspect provides a computer-implemented method of verifying a hardware design for an integrated circuit that implements a function that is exponential in an input variable x over a set of values of x, the method comprising in one or more processors: formally verifying that a first instantiation of the hardware design has a constant multiplication relationship between consecutive values of x in the set of values of x; and verifying that a second instantiation of the hardware design generates an expected output for at least one non-zero value of x in the set of values of x.

A third aspect provides a system for verifying a hardware design for an integrated circuit that implements a function that is polynomial in an input variable x, the system comprising: memory configured to store: the hardware design; and one or more verification tools comprising at least one formal verification tool; and one or more processors configured to: formally verify, using the at least one formal verification tool, that a first instantiation of the hardware design implements a function that is polynomial of degree k in x by formally verifying that for all x in the set of values of x the first instantiation of the hardware design has a constant $k^{th}$ difference; and verify, using one of the one or more verification tool, that a second instantiation of the hardware design generates an expected output in response to each of at least k different values of x in the set of values of x.

A fourth aspect provides a system for verifying a hardware design for an integrated circuit that implements a function that is exponential in an input variable x over a set of values of x, the system comprising: memory configured to store: the hardware design; and one or more verification tools comprising at least one formal verification tool; and one or more processors configured to: formally verify, using the at least one formal verification tool, that a first instantiation of the hardware design has a constant multiplication relationship between consecutive values of x in the set of values of x; and verify, using one of the one or more verification tools, that a second instantiation of the hardware design generates an expected output for at least one non-zero value of x in the set of values of x.

A fifth aspect provides a method of manufacturing an integrated circuit, using an integrated circuit manufacturing system, the method comprising: verifying a hardware design for the integrated circuit according to the method of the first or second aspect; processing, using a layout processing system, the hardware design so as to generate a circuit layout description of the integrated circuit; and manufacturing, using an integrated circuit generation system, the integrated circuit according to the circuit layout description A hardware design for an integrated circuit that implements a function that is polynomial in one or more input variables or a hardware design for an integrated circuit that implements a function that is exponential in one or more input variables, when processed in an integrated circuit manufacturing system, configures the system to manufacture the integrated circuit. There may be provided a non-transitory computer readable storage medium having stored thereon a hardware design for an integrated circuit that implements a function that is polynomial in one or more input variables or a hardware design for an integrated circuit that implements a function that is exponential in one or more input variables that, when processed in an integrated circuit manufacturing system, causes the integrated circuit manufacturing system to manufacture the integrated circuit.

There may be provided an integrated circuit manufacturing system comprising: a non-transitory computer readable storage medium having stored thereon a hardware design for an integrated circuit that implements a function that is polynomial in one or more input variables or a hardware design for an integrated circuit that implements a function that is exponential in one or more input variables; a layout processing system configured to process the computer readable description so as to generate a circuit layout description of the integrated circuit and an integrated circuit generation system configured to manufacture the integrated circuit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
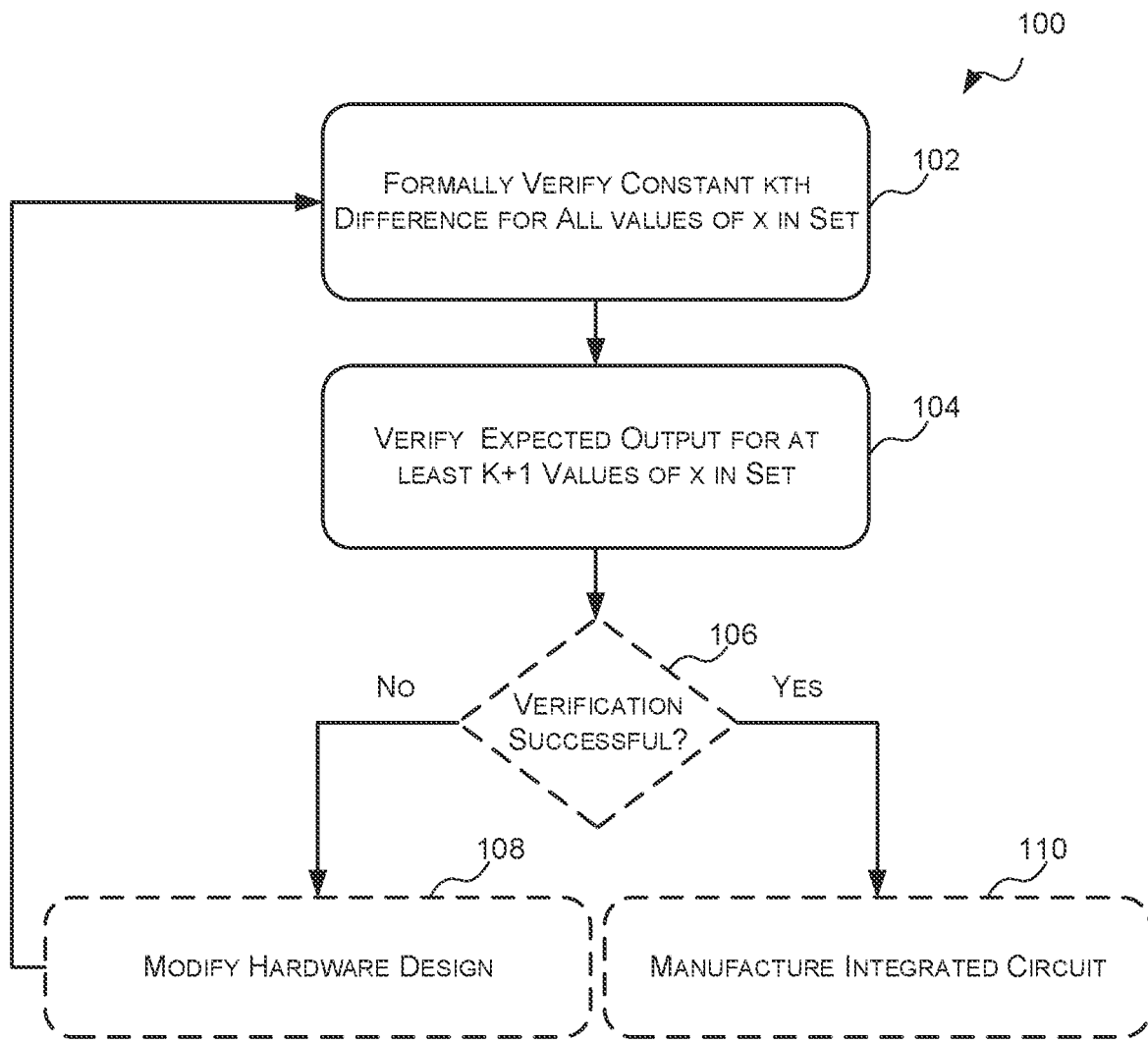
FIG. 1 is a flow diagram of an example method for verifying a hardware design for an integrated circuit that implements a function that is polynomial in one or more input variables.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A hardware design for an integrated circuit is a description of the structure and/or function of an integrated circuit which, when processed at an integrated circuit manufacturing system, causes the integrated circuit manufacturing system to generate an integrated circuit described by the hardware design. For example, as described in more detail below with respect to FIG. 6, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used, such as, but not limited to, proprietary high-level hardware description languages.

An instantiation of a hardware design for an integrated circuit is a representation of the integrated circuit and/or functionality of the integrated circuit defined by the hardware design. An instantiation of a hardware design for an integrated circuit includes, but is not limited to, an emulation model of the hardware design that simulates the behaviour of the integrated circuit defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

A hardware design for an integrated circuit that implements a function that is polynomial in one or more input variables is thus a description of the structure and/or functionality of an integrated circuit to implement the function, which when processed at an integrated circuit manufacturing system causes the integrated circuit manufacturing system to generate an integrated circuit that implements the function. The function may be polynomial in an input variable over all possible values of the input variable or only a subset of the values of the input variable. For example, a function may be polynomial in an input variable for positive values of the input variable, but not polynomial in an input variable for negative values of the input variable.

The term "a function that is polynomial in an input variable" is used to mean that regardless of how the function is implemented it behaves in a polynomial manner (i.e. it generates outputs that can be represented by a polynomial) for a set of values of that input variable. For example, for a two-bit input variable x the function shown in (4) doesn't appear to be polynomial, but in practise, it evaluates to the identity function x which is linear. This is because given the input space, at least one of the multiplicands in the second term must be 0 mod 4. Similarly, any function can be implemented as a look-up table which may not appear to be polynomial on the surface, but if the entries in the table can be represented by a polynomial for some set of values of an input variable then the function is polynomial in that input variable and the methods and systems described herein may $$x+x(x+1)(x+2)(x+3) \bmod 4 \quad (4)$$

Described herein are methods and systems for verifying a hardware design for an integrated circuit that implements a function that is polynomial of degree k in an input variable x for a set X of values of x. The methods include formally verifying, using a formal verification tool, that an instantiation of the hardware design implements a function that is polynomial of degree k in x for the set X of values of x; and then verifying that an instantiation of the hardware design generates an expected output in response to at least k+1 distinct values of x. Formally verifying that an instantiation of a hardware design implements a function that is polynomial of degree k for input variable x for a set X of values of x comprises formally verifying that an instantiation of the hardware design has a constant $k^{th}$ difference with respect to x for the set X of values of x.

This technique works due to the mathematical fact that if a function is verified to be polynomial of degree k with respect to an input variable x (i.e. has a constant $k^{th}$ difference) for a set of values of x then if the function generates an expected output for k+1 distinct values of x in the set X of values then the function will produce an expected output for all values of x in the set X.

The methods and systems described herein for verifying a hardware design for an integrated circuit that implements a function that is polynomial in an input variable x have proven much more likely to converge (i.e. produce a conclusive result) than simply formally verifying that an instantiation of the hardware design generates an expected output for all values of x in the set X of values, particularly when the set X of values is large and/or the function is complex. This is because formal verification tools are very proficient at verifying things that are similar and formally verifying that an instantiation of a hardware design has a constant $k^{th}$ difference involves comparing the output for similar inputs. Thus the formal verification of the constant $k^{th}$ difference is likely to converge. Furthermore, once a constant $k^{th}$ difference has been verified, the minimum number of values of x for which the output needs to be verified is significantly reduced (i.e. reduced to k+1 in some cases and to k in other cases). In other words, verifying a constant $k^{th}$ difference produces a significant reduction in the state space for which the expected output is verified.

Reference is now made to FIG. 1 which illustrates an example method 100 for verifying a hardware design for an integrated circuit that implements a function that is polynomial of degree k in variable x for a set X of values of x. The method 100 may be implemented by a computing-based device such as, but not limited to, the computing-based device 400 described below with respect to FIG. 4. For example, there may be computer readable storage medium having stored thereon computer readable instructions that, when executed at a computing-based device, cause the computing-based device to perform the method 100 of FIG. 1.

The method 100 begins at block 102 where it is formally verified, using a formal verification tool, that an instantiation of the hardware design implements a function that is polynomial of degree k, in an input variable x for the set X of values of x. The set X of values of x may be all of the valid values of x or only a subset of the valid values of x. In the methods and systems described herein formally verifying that an instantiation of a hardware design implements a function that is polynomial of degree k for an input variable x for the set X of values of x comprises formally verifying that the instantiation has a constant $k^{th}$ difference with respect to x for the set X of values of x.

Specifically, let F be an instantiation of a hardware design that receives input x. It can be verified that the instantiation F implements a function that is linearly polynomial (i.e. a polynomial of degree 1) in input variable x for a set X of values of x by verifying that the difference in the output of F for consecutive values of x in the set X of values is constant. This constant difference may be referred to as $\alpha$. Where the set X of values of x comprises a contiguous block of integer values, this can be verified by, for example, verifying that the difference between F(x'+1) and F(x') is equal to the difference in F for any two consecutive values of x as shown in equation (5):

$$F(x+1)-F(x)=F(x'+1)-F(x') \forall x, x' \in X \quad (5)$$

Verifying the property expressed in equation (5) for all values of x in the set X of values verifies that the instantiation F implements a linear polynomial for all values of x in the set X of values because if equation (5) is true then equation (6) is also true (or equivalently for negative x by adding 1 multiple times). As is known to those of skill in the art, equation (6) demonstrates that a constant difference implies the function is linearly polynomial in x. As such, verifying a constant first difference for the set X of values of x verifies that F is linear in x for the set X of values of x.

$$F(x)=F((x-1)+1)=F(x-1)+\alpha= \ldots =F(0)+x\alpha \quad (6)$$

Where the set X of values of x includes zero, equation (5) can be simplified to equation (7) by setting x' to 0. It will be evident to a person of skill in the art that this is an example only and that any value in the set X of values of x can be used for x'.

$$F(x+1)-F(x)=F(1)-F(0) \forall x \in X \quad (7)$$

Equation (7) may be rearranged so as to be written as an addition as opposed to a subtraction as shown in equation (8). Some formal verification tools may find this rephrasing of the property to be easier to work with since it removes the subtraction element.

$$F(x+1)+F(0)=F(x)+F(1) \forall x \in X \quad (8)$$

The constant difference concept can be extended to higher order polynomials to verify that an instantiation of a hardware design implements a higher order polynomial. Linear polynomials (or polynomials of degree 1) are said to have a constant first difference. This means that the difference in a linear polynomial P for consecutive values of x in the set X is constant. Where the set X includes consecutive integer values the first difference can be expressed as shown in equation (9):

$$P(x+1)-P(x) \quad (9)$$

Second order polynomials have a constant second difference. This means that the difference between consecutive first differences is constant. Where the set X includes a contiguous block of integer values the second difference can be expressed as shown in equation (10):

$$[P(x+2)-P(x+1)]-[P(x+1)-P(x)] \quad (10)$$

Equation (10) can be rewritten as equation (11):

$$P(x+2)-2P(x+1)+P(x) \quad (11)$$

In general, a $k^{th}$ order polynomial has a constant $k^{th}$ difference. The phrase "$k^{th}$ difference" is a well-known term of the art, particularly in relation to polynomials. Where the set X includes consecutive integer values the $k^{th}$ difference can be expressed as shown in equation (12):

$$\sum_{i=0}^{k} \binom{k}{i}(-1)^{i}P(x+i) \quad (12)$$

Accordingly, to formally verify that an instantiation of a hardware design implements a function that is polynomial of order k with respect to input variable x it is formally verified that the instantiation has a constant $k^{th}$ difference with respect to input variable x. It can be seen that as k increases the number of terms required to verify a constant $k^{th}$ difference increases. Accordingly, as k increases the complexity of verifying the constant difference increases.

Formally verifying that an instantiation of a hardware design has a constant $k^{th}$ difference with respect to an input variable x may comprise generating one or more assertions to be verified, linking the one or more assertions to the hardware design, and formally verifying, using a formal verification tool, that the one or more assertions are true (or hold) for the hardware design, and outputting one or more signals indicating whether the one or more assertions were successfully verified.

An assertion, which also may be referred to as a lemma, is a statement that a particular property is expected to hold for a hardware design (i.e. is always true). An assertion of the form "assert property [evaluable expression]" is said to "assert" the property specified by the "evaluable expression". If an asserted property (e.g. the evaluable expression) is evaluated to be false for the hardware design for any valid input the hardware design is not behaving as expected and there is an error. For example, in the example assertion "assert property a=b"; if a is not equal to b at any point then the hardware design is not behaving as expected and there is an error.

Assertions are used to capture required temporal and combinational behaviour of an instantiation of a hardware design in a formal and unambiguous way. The hardware design can then be verified to determine that an instantiation thereof conforms to the requirement as captured by the assertion(s). Since assertions capture the instantiation behaviour on a cycle-by-cycle basis they can be used to verify intermediate behaviours.

Assertions are typically expressed in an assertion language. An assertion language, which may also be referred to as a property language, captures the hardware design behaviour spread across multiple hardware design cycles (e.g. clock cycles) in a concise, unambiguous manner. While traditional hardware description languages (HDL), such as an RTL language, have the ability to capture individual cycle behaviour, they are too detailed to describe properties at a higher level. In particular, assertion languages provide means to express temporal relationships and complex hardware design behaviours in a concise manner. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

To verify that an instantiation of a hardware design has a constant $k^{th}$ difference with respect to input variable x, one or more assertions may be generated that, if verified to be true, establish that the instantiation has a constant $k^{th}$ difference and thus establishes the instantiation implements a polynomial of the $k^{th}$ degree in input variable x. The one or more assertions may compare output(s) of the same hardware design over several cycles (e.g. clock cycles) or the one or more assertions may compare output(s) of multiple copies of the hardware design.

The following is an example SVA assertion to verify that an instantiation of a hardware design has a constant first difference with respect to an input variable x using a first copy of the hardware design (imp11) and a second copy of the hardware design (imp12) wherein imp11.out is the output of the first copy of the hardware design, imp12.out is the output of the second copy of the hardware design. As is known to those of skill in the art $past is an SVA construct that returns the value in the previous cycle.

assert property clock_cycle=2|->($past(imp11.out)+
    imp12.out)==(imp11.out+$past(imp12.out));

As would be understood by a person of skill in the art, this assertion states that at clock cycle 2 the output of imp11 in the previous cycle (i.e. cycle 1) plus the output of imp12 in the current cycle is equal to the output of imp11 in the current cycle (i.e. cycle 2) plus the output of imp12 in the previous cycle (i.e. cycle 1). If the assertion is verified under the constraints that the input variable for imp12 is set to 0 in the first cycle and 1 in the second cycle; and the input variable for imp11 can be any value in the first cycle (i.e. x) and is 1 higher in the second cycle (i.e. x+1) then this assertion verifies the property expressed in equation (8). As described in more detail below, under such constraints a formal verification tool will check that this assertion is true for all possible values of x input to imp11. It will be evident to a person of skill in the art that this is an example only and that other suitable assertions or combinations of assertions may be used to verify that an instantiation of a hardware design has a constant $k^{th}$ difference with respect to an input variable x.

Once the one or more assertions have been generated the one or more assertions are linked to the hardware design. The one or more assertions may be linked to the hardware design by incorporating the one or more assertions into the hardware design; or binding the one or more assertions to the hardware design using known methods. Specifically, the one or more assertions may be bound to the relevant signals of the hardware design so that the output thereof can be monitored.

Once the one or more assertions have been linked to the hardware design, the hardware design, the one or more assertions, and the bindings are loaded into a formal verification tool and the formal verification tool is configured to verify that the one or more assertions are true for the hardware design.

An assertion is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability. Since formal verification of a property algorithmically and exhaustively explores all input values (as defined by one or more constraints) over time, verifying a property in this manner allows a property to be exhaustively proved or disproved for all valid states.

When a formal verification tool is used to verify an assertion, the formal verification tool may output an indication of whether or not the assertion is valid (i.e. the asserted property is true for all valid states or sequences of states), which may also be referred to herein as the assertion being successfully verified. The output may be yes, the assertion is valid or has been successfully verified; no, the assertion is not valid (i.e. the asserted property it is not true or has failed for at least one valid state or sequence of states) or has not been successfully verified; or the formal verification was inconclusive. The formal verification may be inconclusive, for example, because the computing-based device running the formal verification tool has run out of memory or because the formal verification tool has determined that a certain amount of progress has not been made after a predefined period of time.

Where an assertion is not valid or has not been successfully verified, the formal verification tool may also output information indicating a state or sequence of states of the hardware design which causes the asserted property to fail, which may be referred to as a counter-example. For example, the formal verification tool may output a trace of the verification indicating at what point, state or sequence of states the failure occurred.

Once the formal verification is complete the method 100 proceeds to block 104.

At block 104, it is verified that an instantiation of the hardware design generates an expected output for at least k+1 different values of x in the set X of values of x. As described in more detail blow, in some cases the number of values of x for which the expected output is verified may be reduced to k.

The verification that an instantiation of the hardware design generates expected outputs for at least k+1 different values of x may be verified via simulation based verification or via formal verification. For example, a set of one or more assertions may be developed, which if verified to be true for the hardware design, establish that an instantiation of the hardware design generates an expected output for at least k+1 different values of x; and the one or more assertions may be formally verified by a formal verification tool. Alternatively, k+1 different values of x may be provided to an instantiation of the hardware design as input via simulation and the output compared to the expected output.

Where the method 100 is used to verify the correctness of the hardware design, verifying that an instantiation of the hardware design generates an expected output for k+1 different values of x may comprise verifying that the instantiation of the hardware design generates a correct output in response to k+1 different values of x according to the function. In other words, it is verified that an instantiation of the hardware design correctly evaluates the function for k+1 different values of x in the set X of values of x. The correctness of the output of the instantiation of the hardware design for k+1 different values of x may be verified using any known technique. For example, the correctness of the output of the instantiation of the hardware design for k+1 different values of x may be verified by comparing the output of the instantiation of the hardware design to values in a look-up table or by comparing the output of the instantiation to an output of a higher level model of the hardware design or function, such as, but not limited to a C model of the hardware design or function.

Where the method 100 is used to verify the equivalence of the hardware design to another hardware design for an integrated circuit that implements a function that is polynomial of degree k in x for the set X of values of x, verifying that an instantiation of the hardware design generates an expected output for k+1 different values of x in the set X of values of x may comprise verifying the functional equivalence of the hardware design and the other hardware design for k+1 different values of x. Verifying the functional equivalence of the hardware design and the other hardware design for k+1 different values of x may comprise verifying that in response to k+1 different values of x instantiations of the two hardware designs generate the same output as each other. In these cases, the method 100 further comprises performing block 102 for the other hardware design (i.e. formally verifying that the other hardware design implements a polynomial of degree k in x for the set X of values of x by formally verifying that an instantiation of the other hardware design has a constant $k^{th}$ difference with respect to x for the values of x in the set X). This method works because of the mathematical fact that two polynomials are the same if and only if they are of the same degree k, and agree for k+1 distinct values of the input variable.

The k+1 distinct values of the input variable x in the set X may be any k+1 distinct values from the set X. In some cases, the k+1 distinct values of x may be a contiguous block of values in the set X. For example, the k+1 distinct values of x may comprises the set {0, 1, . . . , k} or the set $$\left\{\frac{-k}{2}, \ldots, 0, \ldots, \frac{k}{2}\right\}.$$

In some cases, it may be advantageous to verify the output of an instantiation of the hardware design for more than k+1 distinct values of x. For example, where k is not an exact power of two and the expected output verification is completed via formal verification, formal verification engines may find the verification easier if x is restricted to the next power of two up from k in order to align the restriction to a specific number of bits of data.

Once the expected output verification is complete the method 100 may end or the method 100 may proceed to block 106.

At block 106, a determination is made as to whether the verification of the hardware design was successful (i.e. the verifications in blocks 102 and 104 were successful). As described above, when a formal verification tool is used to verify an assertion for a hardware design, the formal verification tool may output a signal or a set of signals that indicates whether or not the assertion is valid (i.e. the asserted property is true for all valid states or sequence of states). Where block 104 is performed via simulation based verification the simulation tool used to perform the verification may also output one or more signals that indicate whether or not the verification was successful. In these cases, the determination as to whether the verification was successful may be based on the output signal(s).

If it is determined that the verification was successful (indicating that the instantiation of the hardware design is working as expected) the method 100 may proceed to block 110 where an integrated circuit described by the hardware design is manufactured. If, however, it is determined that the verification of the hardware design was not successful (indicating that there is an error in the hardware design) then the method 100 may proceed to block 108 where the hardware design is modified to correct the error in the hardware design that caused the unexpected behaviour. As described above, when the verification of an assertion is not successful the formal verification tool may output information indicating a state or sequence of states of an instantiation of the hardware design which cause the assertion to fail (i.e. a counter-example). In these cases, the modification may be based on the information indicating the state or sequence of states which cause the assertion to fail. Once the hardware design has been modified the modified hardware design may be re-verified (e.g. blocks 102-110 may be repeated for the modified hardware design).

Although blocks 102 and 104 are shown in FIG. 1 as being executed sequentially it will be evident to a person of skill in the art that this is an example only and that in other examples blocks 102 and 104 may be executed in the reverse order (i.e. block 104 may be executed before block 102) or they may be executed concurrently.

Unknown k

In many cases the degree k of the polynomial with respect to an input variable x that implemented by a function may be known, or determined from the specification for the hardware design. However, in some cases the degree k of the polynomial with respect to an input variable x may be unknown. Where, the degree k of the polynomial with respect to the input variable x is unknown, the method 100 may further comprise, prior to performing blocks 102 and 104, determining k. In some cases, k may be determined by (i) selecting a possible value for k; (ii) calculating two consecutive $k^{th}$ differences for an instantiation of the hardware design; (iii) if the two differences are the same and non-zero then determining k is the degree of the polynomial; if the two difference are equal to zero then determining k is too high and reducing k and repeating (i), (ii) and (iii) for the reduced k; and if the differences are not the same then determining k is too low, increasing k and repeating (i), (ii) and (iii) for the increased k. For example, if in (i) k=1 is selected then first differences F(1)−F(0) and F(2)−F(1) may be calculated in (ii) and compared in (iii).

Known Constant Difference

The number of different values of x over which the expected output is verified in block 104 may be reduced to k (where k is the degree of the polynomial in x) if the constant $k^{th}$ difference c is known in advance and it is verified in block 102 that the $k^{th}$ difference for all values of x in the set X is equal to the expected constant c. For example, where the method 100 is used to verify the correctness of a hardware design, instead of verifying the property expressed in equation (5) or equation (7) in block 102 to verify that an instantiation of a hardware design implements a linear polynomial in x, if the property expressed in equation (13) is verified then the number of different values of x over which the expected output is verified in block 104 may be reduced to k.

$$F(x+1)-F(x)=c \quad (13)$$

Where the method 100 is used to verify the equivalence of two hardware designs, in addition to verifying, for the hardware design under test, that the $k^{th}$ difference for all values of x in the set X is equal to the expected constant c, if it is also verified, for the other hardware design, that the $k^{th}$ difference for all values of x in the set X is equal to the same constant c then the number of different values for which the equivalence of the two hardware designs is verified in block 104 may be reduced to k.

The number of values of x for which the expected output is verified may be reduced to k in these cases because if it is proved that an instantiation of the hardware design produces the correct output for k values and it is proved that the instantiation of the hardware design produces the correct $k^{th}$ difference for all x in the set X, then the instantiation must produce the correct output for the $(k+1)^{th}$ value in the set X. This is because if the $k^{th}$ difference is correct for all x in the set X, then the instantiation must produce the correct output for the $(k+1)^{th}$ value of x in the set X for the $k^{th}$ difference to be correct.

However, this may not be possible in all cases, because in some cases verifying that the $k^{th}$ difference is equal to a known constant c may be as difficult for a formal verification tool to perform as a naïve verification that the output for all values of the input variable in the set is as expected. Furthermore, in many cases, where there are other input variables to the function (i.e. input variables other than x), the constant varies with the values of the other inputs. However, it may be possible to verify that the $k^{th}$ difference is equal to a constant c where the constant is easily describable in its own right (e.g. if it is a simple constant or the value of one of the other input variables).

Functions that Implement Multiple Polynomials in the Same Input Variable

It is possible for a function to be separately polynomial over different subsets of values of the input variable x. For example, a function may polynomial over the positive values of an input variable x and separately polynomial over the negative values of x. Hardware designs for integrated circuits that implement such functions may be verified by performing blocks 102 and 104 of the method 100 of FIG. 1 for each polynomial in x implemented by the function. For example, where a function is polynomial of degree k in an input variable x over a first set of values (e.g. positive values) of x, and separately polynomial of degree r in x over a second set of values (e.g. negative values) of x, a hardware design for such a function may be verified by:

1. Formally verifying that an instantiation of the hardware design implements a function that is polynomial of degree k in x by formally verifying that for all x in the first set of values of x the first instantiation of the hardware design has a constant $k^{th}$ difference (block 102);
2. Formally verifying that an instantiation of the hardware design implements a function that is polynomial of degree r in x by formally verifying that for all x in the second set of values of x the first instantiation of the hardware design has a constant $r^{th}$ difference (block 102);
3. Verifying that an instantiation of the hardware design generates an expected output in response to each of k+1 different values of x in the first set of values of x (block 104); and
4. Verifying that an instantiation of the hardware design generates an expected output in response to each of r+1 different values of x in the second set of values of x (block 104).

Accordingly, in these cases the total number of values of the input variable x over which the expected output is verified is k+r+2.

In some cases, even if a function implements the same polynomial for a set of values of an input variable x, the verification of a hardware design for an integrated circuit that implements the function may be completed as if the function implemented a different polynomial for different subsets of that set. Specifically, in some cases, the set of values of x may be divided into a plurality of subsets and blocks 102 and 104 may be performed for each subset. For example, even if the function implements the same polynomial for all values of x the verification (i.e. blocks 102 and 104) may be performed separately for positive values of x and negative values of x. In some cases, dividing a set of values of an input variable x into a plurality of subsets and performing blocks 102 and 104 separately for each subset may increase the chances that the formal verification will converge.

It is noted that although the method 100 has been described above in relation to verifying hardware designs for integrated circuits that implement a function that is polynomial over a set or sets of contiguous values of an input variables, the method can also be used to verify hardware designs for integrated circuits that implement a function that is polynomial over a set or sets of values of an input variable that are not contiguous so long as the values in the set are equally spaced. Accordingly the methods and techniques described above may be used to verify a hardware design for an integrated circuit that implements a function that is separately polynomial over even and odd values of an input variable. As described above, the $k^{th}$ difference of the instantiation of a hardware design is calculated from the first difference of the instantiation of the hardware design. The first difference is the difference between the outputs of the instantiation in response to consecutive values of the input variable in the set. It is noted that the term "consecutive values of the input variable" means consecutive values of the input variable in the set of input values over which the function is polynomial. Therefore where, for example, the set of values comprises even values of x then consecutive values in the set are the even values. In these cases, the first difference may be calculated as shown in equation (14):

$$F(x+2)-F(x) \quad (14)$$

Multiple Input Variables

The method 100 of FIG. 1 sets out a method of verifying a hardware design for an integrated circuit that implements a function that has a single input variable x and is polynomial in that variable. However, other functions may have multiple input variables—e.g. input variable x in which the function is polynomial and one or more other input variables y. Verifying that an instantiation of a hardware design for an integrated circuit that implements such a function has a constant $k^{th}$ difference for input variable x may comprise verifying that the instantiation has a constant $k^{th}$ difference with respect to x separately for each possible value of the one or more other inputs y.

Specifically, let F be an instantiation of a hardware design that receives inputs x and $\underline{y}$ such that $F=F(x,\underline{y})$. Let $F_{\underline{y}}$ denote F for fixed $\underline{y}$ as shown in equation (15):

$$F_{\underline{y}}(x)=F(x,\underline{y}) \quad (15)$$

It can be verified that the instantiation F implements a function that is linearly polynomial (i.e. a polynomial of degree 1) in input variable x for the set of values X of x for $\underline{y}$ by verifying that the difference in $F_{\underline{y}}$ for consecutive values of x in the set X of values of x is constant. Where the set X of values of x comprises a contiguous block of integer values, this can be verified by, for example, verifying that the difference between $F_{\underline{y}}(x'+1)$ and $F_{\underline{y}}(x')$ is equal to the difference between $F_{\underline{y}}$ for any two consecutive values of x as shown in equation (16):

$$F_{\underline{y}}(x+1)-F_{\underline{y}}(x)=F_{\underline{y}}(x'+1)-F_{\underline{y}}(x') \forall x \in X, x', \underline{y} \quad (16)$$

The property expressed in equation (16) (or an equivalent formulation thereof) is then verified for each $\underline{y}$.

By verifying a constant $k^{th}$ difference in x separately for each value of the one or more other inputs y the verification will be successful even if the polynomial in x implemented by the function is different (but the same degree) for different values of the other input(s) y.

Once the constant $k^{th}$ difference for x has been verified for each value of the one or more other inputs y then the instantiation is implementing a function that is polynomial of degree k in x even though it may be implementing a different polynomial for different values of the one or more other inputs y.

Functions that are Polynomial in Multiple Input Variables

In some cases, a function may be polynomial in multiple input variables. For example, a function may be polynomial of degree k in a first input variable x and polynomial of degree q in a second input variable z. A hardware design for an integrated circuit that implements a function that is polynomial in multiple input variables may be verified by performing block 102 for each variable in which the function is polynomial and then verifying that an instantiation of the hardware design generates an expected output for a limited set of values of each of the input variables. For example, a hardware design for an integrated circuit that implements a function that is polynomial of degree k in a first input variable x for a set of values of x and polynomial of degree q in a second input variable z for a set of values of z may be verified by:

1. Formally verifying, for each value of z, that an instantiation of the hardware design implements a function that is polynomial of degree k in x by formally verifying that for all x in the set of values of x the instantiation of the hardware design has a constant $k^{th}$ difference (block 102);
2. Formally verifying, for each value of x, that an instantiation of the hardware design implements a function that is polynomial of degree q in z by formally verifying that for all z in the set of values of z the instantiation of the hardware design has a constant $q^{th}$ difference (block 102); and
3. Verifying that an instantiation of the hardware design generates an expected output for k+1 different values of x in the set of values of x under the constraint that z is restricted to q+1 different values of z in the set of values of z (block 104).

It will be evident to a person of skill in the art that this is an example only and the method can be extended to a function that is polynomial in any number of input variables.

Where block 102 is executed for multiple input variables, the formal verification of the constant difference for some of the input variables may be simplified based on the formal verification of the constant difference for other input variables. For example, for a function that is polynomial of degree k in input variable x and polynomial of degree q in input variable z, if a constant $k^{th}$ difference for input variable x has been formally verified for all inputs then the formal verification of the $q^{th}$ difference for input variable z can be restricted, or limited, to k+1 values of x.

More generally, for a function that is polynomial in multiple input variables a hierarchy or ordering of the polynomial input variables may be determined such that a full constant difference verification (i.e. for all values of the input variables) is performed for the highest input variable in the hierarchy and the constant difference for any other input variable in the hierarchy is performed with any higher ordered input variables restricted, or limited to, $k_i$+1 values where $k_i$ is the degree of the polynomial for the $i^{th}$ input variable in the hierarchy. For example, let there be an example function that is polynomial of degree $k_1$ in input variable $x_1$, polynomial of degree $k_2$ in input variable $x_2$, and polynomial of degree $k_3$ in input variable $x_3$ and a hierarchy of the input variables is such that input variable $x_1$ is the highest in the hierarchy, input variable $x_2$ is the second highest in the hierarchy and input variable $x_3$ is the lowest in the hierarchy. In this example, the constant $k_1^{th}$ difference for input variable $x_1$ is formally verified for all values of the input variables; the constant $k_2^{th}$ difference for input variable $x_2$ is formally verified for all values of the input variables except $x_1$ is restricted, or limited to, $k_1+1$ different values; and the constant $k_3^{th}$ difference for input variable $x_3$ is formally verified for all values of the input variables except $x_1$ is restricted, or limited to, $k_1+1$ different values and $x_2$ is restricted, or limited to, $k_2+1$ different values.

The polynomial input variables of a function may be placed in any order or hierarchy. In some cases, the polynomial input variables may be placed in an order according to the degree of their polynomial such that the input variables with a lower degree of polynomial (and thus lower degree difference) are higher in the hierarchy than input variables with a higher order polynomial (and thus higher degree difference). This may increase the likelihood that the formal verifications of the constant differences converge because lower order differences are easier to verify than higher order differences.

Bitwise Constant Difference

As described above with respect to block 102 of FIG. 1, verifying that an instantiation of a hardware design has a constant $k^{th}$ difference may comprise comparing (or at least computing) the output of the instantiation in response to an input variable x and the output of the instantiation in response to x+1 for all values of x in the relevant set X of values. Where the input variable is an n-bit integer generating x+1 may, in some cases, result in a long carry. Specifically generating x+1 may involve flipping a lot of bits of x. For example, if x is an 8-bit integer equal to 01111111 then x+1 is 10000000 which requires flipping all of the bits. Depending on the hardware design the formal verification tool may find it difficult to verify the constant difference in a single step for all relevant values of x due to the long carries. For example, some hardware designs for an integrated circuit that implements a large dot product function may be configured to split operands up into component parts and sum them in separate locations. In such cases the logic for processing x and x+1 may change significantly making it difficult for a formal verification tool to verify the difference is as expected.

Accordingly, in some cases, to avoid long carries and the problems associated therewith in formal verification, where the constant difference is known in advance, instead of verifying that an instantiation of a hardware design has a constant $k^{th}$ difference with respect to x by formally verifying a single property for all relevant values of x (e.g. verifying equation (13)) it may be more efficient to verify the constant difference at a bit-level in order to avoid large carries between x and x+1. Specifically, instead of verifying that the difference in the output of an instantiation of the hardware design F for consecutive values of x in the set X of values is equal to a constant c (i.e. $F(x+1)-F(x)=c$) (equation (13)), verifying for each bit of x that the difference in the outputs of an instantiation of the hardware design F for a first value of x and a second value of x is equal to $2^i *c$ wherein the $i^{th}$ least significant bit (LSB) of the second value of x is 0 and the $i^{th}$ LSB of the first value of x is 1 and all other bits of the first value of x and the second value of x are the same. This is expressed in equation (17) wherein $x'_i$ is the first value of x and $x''_i$ is the second value of x. Equation (17) can alternatively be expressed as equation (18) as the difference between $x'_i$ and $x''_i$ will be $2^i$. By always changing a single bit from 0 to 1 there will be no carries in x. It is noted that there still may be carries once x is multiplied by its coefficient, but only changing a single bit between $x'_i$ and $x''_i$ can significantly simplify the carry logic.

$$F(x'_i)-F(x''_i)=2^i *c \quad (17)$$

$\forall x'_i, x''_i \in X$ wherein the $i^{th}$ LSB of $x'_i=1$ and the $i^{th}$ LSB of $x''_i=0$; and all other bits of $x'_i$ and $x''_i$ are the same $$F+(x+2^i)-F(x)=2^i *c \quad (18)$$

$\forall x \in X$ wherein the $i^{th}$ LSB of x is zero

For example, if the objective is to verify that $F(x+1)-F(x)=c$ wherein x is a 4-bit binary number and c is a constant then this can be verified by:
1. Verifying that $F(x+1)-F(x)=c$ for all values of x in the relevant set X of values wherein the $0^{th}$ LSB of x is zero;
2. Verifying that $F(x+2)-F(x)=2c$ for all values of x in the relevant set X of values wherein the $1^{st}$ LSB of x is zero;
3. Verifying that $F(x+4)-F(x)=4c$ for all values of x in the relevant set X of values wherein the $2^{nd}$ LSB of x is zero; and
4. Verifying that $F(x+8)-F(x)=8c$ for all values of x in the relevant set X of values wherein the $3^{rd}$ LSB (i.e. the MSB) of x is zero.

Each of the verifications in steps 1 to 4 above may be referred to as a bit verification. It will be evident to a person of skill in the art that the bit verifications may alternatively be framed as an addition as opposed to a subtraction. An example of equation (18) written as an addition, opposed to a subtraction, is shown in equation (19):

$$F(x+2^i)=F(x)+2^i *c \quad (19)$$

In some cases, to simplify the bit verifications and increase the likelihood that they will converge, a hierarchy or ordering of the bits may be developed or generated and the verification for the highest bit in the hierarchy is performed as described above (i.e. under the assumption that the $i^{th}$ LSB of x is zero), however the verification for any other bit in the hierarchy is performed under an assumption or constraint that any bit higher in the hierarchy is set to zero.

For example, if the objective is to verify that $F(x+1)-F(x)=c$ wherein x is a 4-bit binary number, c is a constant and the bits are ordered from lowest to highest (i.e. the $0^{th}$ bit is the highest in the hierarchy and the $3^{rd}$ bit is the lowest in the hierarchy) then this can be verified by:
1. Verifying that $F(x+1)-F(x)=c$ for all values of x in the relevant set of values wherein the LSB of x is zero;
2. Verifying that $F(x+2)-F(x)=2c$ for all values of x in the relevant set of values wherein the first two LSBs of x are zero;
3. Verifying that $F(x+4)-F(x)=4c$ for all values of x in the relevant set of values wherein the first three LSBs of x are zero; and
4. Verifying that $F(x+8)-F(x)=8c$ for x=0.

It will be evident to a person of skill in the art that this is an example ordering or hierarchy of the bits and any other ordering of the bits may be used. For example, if the objective is to verify that $F(x+1)-F(x)=c$ wherein x is a 4-bit binary number, c is a constant and the bits are ordered from highest to lowest (i.e. the $3^{rd}$ bit is the highest in the hierarchy and the $0^{th}$ bit is the lowest in the hierarchy) then this can be verified by:
1. Verifying that $F(x+8)-F(x)=8c$ for all values of x in the relevant set of values wherein the MSB of x is zero;
2. Verifying that $F(x+4)-F(x)=4c$ for all values of x in the relevant set of values wherein the first two MSBs of x are zero;

3. Verifying that $F(x+2)-F(x)=2c$ for all values of x in the relevant set of values wherein the first three MSBs of x are zero; and
4. Verifying that $F(x+1)-F(x)=c$ for $x=0$.

Although the bitwise method of verifying a constant $k^{th}$ difference for a hardware design is described above for $k=1$ (i.e. for a linear polynomial) a person of skill in the art would understand that the bitwise method can similarly be used to verify a constant higher order difference.

Dot Products

The method 100 of FIG. 1 may be used to verify a hardware design for an integrated circuit that implements a function $f$ that is a dot product of n-element vectors a and b as shown in equation (20) wherein $a=(a_0, \ldots, a_{n-1})$, $b=(b_0, \ldots, b_{n-1})$, d is a constant and each $a_i$ and $b_i$ is in a j-bit integer format Ij because such a function is polynomial of degree 1 in each $a_i$ and $b_i$. More specifically, such a hardware design may be verified by performing block 102 (i.e. verifying the first difference is constant) for each $a_i$ and each $b_i$ and then performing block 104 wherein each $a_i$ and $b_i$ is restricted to two values (i.e. $k=1$, therefore $k+1=2$).

$$f(a,b)=a\cdot b+d=a_0b_0+a_1b_1 \ldots +a_{n-1}b_{n-1}+d \tag{20}$$

However, instead of performing block 102 2n times (one for each $a_i$ and $b_i$) the inventors have identified that a hardware design for an integrated circuit that implements such a function may alternatively be verified by formally verifying that an instantiation of the hardware design is symmetric; performing block 102 (i.e. verifying the first difference is constant) for one $a_i$ or one $b_i$; and performing block 104 wherein each $a_i$ and $b_i$ is restricted to two values (e.g. 0 and 1). As described above, where the first difference is known and in block 102 is it verified that the first difference is equal to the expected value then each $a_i$ and $b_i$ can be restricted to a single value (e.g. 0) in block 104. In some cases, this set of formal verifications may be more likely to converge than performing block 102 2n times and performing block 104 once when each $a_i$ and $b_i$ is restricted to two values.

Verifying that an instantiation of a hardware design for an integrated circuit that implements a dot product function is symmetric (or permutation independent) verifies that for any set of elements in the input vectors an instantiation of the hardware design will produce the same output for any permutation of the elements in the input vectors (e.g. a and b) so long as the input vectors are permutated in the same way. For example, verifying that an instantiation of a hardware design is symmetric verifies an instantiation will produce the same output if it receives inputs $a=(1,2,3)$ and $b=(4,5,6)$ or inputs $a=(3,2,1)$ and $b=(6,5,4)$. By verifying that an instantiation of a hardware design for an integrated circuit that implements a dot product function is symmetric, or permutation independent, for all permutations of the input vectors then it is sufficient if only one constant difference verification is performed as this can be extended, via the symmetry verification, to all permutations.

Verifying that an instantiation of a hardware design for an integrated circuit that implements a dot product function is symmetric (or permutation independent) may comprise verifying that the output of an instantiation of the hardware design for inputs a and b is the same as the output of the instantiation for inputs $b_\sigma$ and $a_\sigma$ as shown in equation (21) where $a_\sigma$ and $b_\sigma$ are generated by applying the same permutation $\sigma$ to a and b respectively. If equation (21) is verified for all a and b (i.e. all $a, b \in Ij^n$) and for each permutation $\sigma$ in a set of permutations S from which any permutation of $\{0, 1, \ldots n-1\}$ can be generated then it has been verified that an instantiation of the hardware design is symmetric or permutation independent.

$$F(a,b)=F(b_\sigma, a_\sigma) \tag{21}$$

As is known to those of skill in the art, a permutation $\sigma$ of an input vector x is a permutation (i.e. an ordering) of the input elements $x_i$ of the input vector x. Where the input vector x has n input elements $x_i$ there will be n! permutations of the input vector x. For example, an input vector x comprising three input elements $(x_0, x_1, x_2)$ will have $3!=6$ permutations (or orderings) $\sigma$ for a set of input elements $\{x_0, x_1, x_2\}$ as shown below. The collection of all possible permutations for a set of n input elements will be referred to herein as Sym(n). Accordingly, Sym(n) when $n=3$ is $\{\sigma_0, \sigma_1, \sigma_2, \sigma_3, \sigma_4, \sigma_5\}$.

$$\sigma_0(x_0,x_1,x_2)=(x_0,x_1,x_2)$$

$$\sigma_1(x_0,x_1,x_2)=(x_0,x_2,x_1)$$

$$\sigma_2(x_0,x_1,x_2)=(x_1,x_0,x_2)$$

$$\sigma_3(x_0,x_1,x_2)=(x_1,x_2,x_0)$$

$$\sigma_4(x_0,x_1,x_2)=(x_2,x_0,x_1)$$

$$\sigma_5(x_0,x_1,x_2)=(x_2,x_1,x_0)$$

The set of permutations S may include all possible permutations (e.g. Sym(n)) or the set may include a generating set G of permutations. A generating set G of input vector permutations is a set of input vector permutations $\phi_i$ (e.g. $G=\{\phi_i | i=1, \ldots, m\}$) from which all of the input vector permutations Sym(n) can be generated. Accordingly, $G \subseteq Sym(n)$. An input vector permutation $\sigma$ can be generated from a generating set G of input vector permutations if the input vector permutation $\sigma$ can be written as a sequence of the input vector permutations $\phi_i$ in the generating set G. Specifically, a relevant input vector permutation $\sigma$ can be generated from a generating set G of input vector permutations if the input vector permutation $\sigma$ can be written in the form shown in equation (22):

$$\sigma = \phi_{i_0}^{s_0} \ldots \phi_{i_k}^{s_k} \text{ for some } i_0 \ldots i_k \in \{1, \ldots m\},$$
$$s_0 \ldots s_k \in \{1,-1\} \tag{22}$$

where $\phi_i^1$ is equal to $\phi_i$, and $\phi_i^{-1}$ is the reverse or inverse permutation of $\phi_i$ such that $\phi_i^1 \phi_i^{-1}$ or $\phi_i^{-1} \phi_i^1$ leaves all the elements in the same order.

In some cases, the generating set G may comprise only adjacent transpositions. A transposition is a permutation in which the position of two elements $x_i$ in the n-element input vector is swapped (e.g. element i is swapped with element $i+4$) and all other elements remain in the same position. An adjacent transposition is a transposition in which the position of two adjacent elements is swapped (e.g. element i is swapped with element $i+1$). An adjacent transposition which swaps the $i^{th}$ element and the $(i+1)^{th}$ element is denoted $\sigma_{at-i}$ and shown in equation (23):

$$\sigma_{at-i}x=\sigma_{at-i}(x_0, \ldots, x_{i-1}, x_i, x_{i+1}, x_{i+2}, \ldots, x_{n-1})=$$
$$(x_0, \ldots, x_{i-1}, x_{i+1}, x_i, x_{i+2}, \ldots, x_{n-1}) \tag{23}$$

For example, the permutation $\sigma_{at-0}$ (shown in equation (24)) swaps the $0^{th}$ element and the $1^{st}$ element:

$$\sigma_{at-0}x=(x_1,x_0,x_2, \ldots, x_{n-1}) \tag{24}$$

Since an adjacent transposition is the smallest change to an input vector, formal verification tools are typically (although not always) able to efficiently verify that the outputs for any input vector x and for the permutation of that input vector according to an adjacent transposition $\sigma_{at-i}$ are the same.

It can easily be shown that any input vector permutation $\sigma_i$ in Sym(n) can be generated from the set of adjacent transpositions $\{\sigma_{at-0}, \sigma_{at-1}, \ldots, \sigma_{at-n-2}\}$. For example, as described above, if the input vectors x comprise three input elements (i.e. n=3) then there are n!=6 permutations i.e. Sym(n)=$\{\sigma_0, \sigma_1, \sigma_2, \sigma_3, \sigma_4, \sigma_5\}$. Each of the input vector permutations $\sigma_i$ can be written as a combination of one or more adjacent transpositions in the set $\{\sigma_{at-0}, \sigma_{at-1}\}$ as shown below:

$\sigma_0(x_0,x_1,x_2)=(x_0,x_1,x_2)=\sigma_{at-i}\sigma_{at-i}x=x$ $\sigma_1(x_0,x_1,x_2)=(x_0,x_2,x_1)=\sigma_{at-1}x$ $\sigma_2(x_0,x_1,x_2)=(x_1,x_0,x_2)=\sigma_{at-0}x$ $\sigma_3(x_0,x_1,x_2)=(x_1,x_2,x_0)=\sigma_{at-1}\sigma_{at-0}x$ $\sigma_4(x_0,x_1,x_2)=(x_2,x_0,x_1)=\sigma_{at-0}\sigma_{at-1}x$ $\sigma_5(x_0,x_1,x_2)=(x_2,x_1,x_0)=\sigma_{at-1}\sigma_{at-0}\sigma_{at-1}x$ Accordingly, in some cases, the generating set G may comprise $\{\sigma_{at-0}, \sigma_{at-1}, \ldots, \sigma_{at-n-2}\}$. Verifying that an instantiation of the hardware design is permutation respecting for each of the permutations in such a generating set comprises verifying equation (21) for each of n−1 permutations.

In other cases, the generating set G may comprise one or more adjacent transpositions and a cycle permutation. A cycle permutation, denoted $\sigma_c$, is the permutation in which every element is moved to the next position and the element in the last position is moved to the first (or $0^{th}$) position. In other words, the $0^{th}$ element moves to the $1^{st}$ position, the $1^{st}$ element moves to the $2^{nd}$ position, and so on, so that the $i^{th}$ element is moved to the $(i+1)^{th}$ position, up to the $(n-2)^{th}$ element which is moved to the $(n-1)^{th}$ position. The $(n-1)^{th}$ element is then moved to the $0^{th}$ position as shown in equation (25):

$$\sigma_c x = (x_{n-1}, x_0, x_1, \ldots, x_{n-2}) \quad (25)$$

It can easily be shown that any input vector permutation $\sigma_i$ in Sym(n) can be generated from the set of permutations $\{\sigma_{at-0}, \sigma_c\}$. For example, as described above, if the input vector x comprises three input elements (i.e. n=3) then there are n!=6 permutations i.e. Sym(n)=$\{\sigma_0, \sigma_1, \sigma_2, \sigma_3, \sigma_4, \sigma_5\}$. Each of the input vector permutations $\sigma_i$ can be written as a combination of one or more permutations in the set $\{\sigma_{at-0}, \sigma_c\}$ as shown below:

$\sigma_0(x_0,x_1,x_2)=(x_0,x_1,x_2)=\sigma_{at-0}\sigma_{at-0}x=X$ $\sigma_1(x_0,x_1,x_2)=(x_0,x_2,x_1)=\sigma_{at-0}\sigma_c x$ $\sigma_2(x_0,x_1,x_2)=(x_1,x_0,x_2)=\sigma_{at-0}x$ $\sigma_3(x_0,x_1,x_2)=(x_1,x_2,x_0)=\sigma_c \sigma_c x$ $\sigma_4(x_0,x_1,x_2)=(x_2,x_0,x_1)=\sigma_c x$ $\sigma_5(x_0,x_1,x_2)=(x_2,x_1,x_0)=\sigma_c \sigma_{at-0}x$ Accordingly, in some cases, the generating set G may comprise $\{\sigma_{at-0}, \sigma_c\}$. However, since formal verification tools tend to be better at verifying things that are similar than things that are different—and x will be significantly different from $\sigma_c x$ as all the elements will be in different positions—some formal verification tools may not be able to efficiently verify that an instantiation of the hardware design produces the same output for x and $x\sigma_c$. This may, however, be dependent on the formal verification tool and/or the configuration (e.g. internal structure) of the integrated circuit.

It will be evident to a person of skill in the art that these are example generating sets only and that other suitable generating sets may be used. For example, other generating sets may comprise an adjacent transposition (e.g. $\sigma_{at-1}$) and a cycle permutation.

As is known to those of skill in the art, the identity permutation or map is the permutation in which the elements of the vector are in the same order as they were input (i.e. $\sigma_0(x_0, x_1, x_2)=(x_0, x_1, x_2)$). In some cases, the set of permutations S may comprise a set of permutations such that the identity permutation can be generated from an odd number of permutations in the set S. This may be advantageous because verifying the symmetry of a hardware design (e.g. verifying the property expressed in equation (21)) for each permutation in such a set S inherently verifies F(a, b)=F(b, a). In other cases, the set of permutations S may include the identity permutation or F(a, b)=F(b, a) may be verified separately.

As described above, once it has been verified that an instantiation of the hardware design for an integrated circuit that implements a dot product function is symmetric (or permutation independent) then verifying that the instantiation implements a linear function (i.e. that the instantiation has a constant first difference) in one $a_i$ or one $b_i$ is sufficient to verify that the instantiation is linear in all elements because the linearity in one element can be extended to all the other elements via the symmetry verification. In some cases, verifying that an instantiation of a hardware design for an integrated circuit that implements a dot product function has a constant first difference for an element of the input vectors may comprise verifying one of the equations described above with respect to block 102 of FIG. 1. However, in other cases, verifying that an instantiation of a hardware design for an integrated circuit that implements a dot product function has a constant first difference with respect to input variable $a_0$ may be simplified by verifying that the output of an instantiation of the hardware design in response to inputs a and b plus $b_0$ is equal to the output of an instantiation of the hardware design F in response to inputs $a+e_0$, and b as shown in equation (26) for all a and b (i.e. all a, $b \in Ik^n$) wherein $e_i$ is an n-element vector with i zero elements, followed by a 1 element, and n−1−i zero elements.

$$F(a+e_0,b)=F(a,b)+b_0 \quad (26)$$

As $e_0$=(1, 0, . . . , 0), $e_0$ adds 1 to $a_0$ such that $a+e_0=(a_0+1, a_1, \ldots, a_{n-1})$ verifying the property expressed in equation (26) for all a and b verifies that the difference between the output for consecutive values of $a_0$ when all other input elements are the same is constant (i.e. equal to $b_0$). As the input elements are j-bit integers, to ensure that $a+e_0$ does not overflow, equation (26) may be verified under the constraint that $a_0$ is less than max (Ij) (i.e. $a_0$ is not all 1's).

The symmetry verification (e.g. verification of the property expressed in equation (21)) allows both $$\frac{\delta f}{\delta a_i} = b_i \text{ and } \frac{\delta f}{\delta b_i} = a_i$$

to be inferred for all i from the constant difference verification for one $a_i$ (e.g. $a_0$) (e.g. verification of the property expressed in equation (26)).

By expressing the exact gradient (difference) (i.e. $b_0$) for each set of inputs a and b as in equation (26) the constant difference property is expressed in a manner that is easier for formal verification tools to verify. This is because verifying equality to a specific value (i.e. specific gradient) is generally simpler for a formal verification tool to verify than verifying equality to an expression (e.g. F(1)−F(0)).

Once the symmetry verification and the constant first difference for a single $a_i$ or $b_i$ has been performed, the expected output for only a single a and a single b is required to be verified. For example, a=(0, ... , 0) and b=(0, ... , 0) may be verified. F(0,0) should be equal to d so this can be verified by verifying that the output of the instantiation is d when the inputs are all zero.

Where the two input vectors a and b have different formats any permutations that swap a and b may not be performed and a separate verification of the constant $k^{th}$ difference may be completed for a $b_i$ (e.g. $b_0$).

Dot Products and Bitwise Constant Difference

Since a dot product has a known constant difference for each input element the bitwise method of verifying a constant difference can be used to verify that an instantiation of a hardware design for an integrated circuit that implements a dot product function has a constant first difference for one of the input elements (e.g. $a_0$). For example, if a hardware design for an integrated circuit that implements the dot product function $f$ shown in equation (20) where each element is a j-bit binary number then it may be verified that an instantiation of the hardware design has a constant first difference with respect to input element $a_0$ by:
1. Verifying that $F(a+e_0, b)−F(a, b)=b_0$ for all a and b where the $0^{th}$ LSB of $a_0$ is zero;
2. Verifying that $F(a+2e_0, b)−F(a, b)=2b_0$ for all a and b where the $1^{st}$ LSB of $a_0$ is zero;
3. Verifying that $F(a+4e_0, b)−F(a, b)=4b_0$ for all a and b where the $2^{nd}$ LSB of $a_0$ is zero;
4. ...
5. Verifying that $F(a+2^{j-1}e_0, b)−F(a, b)=2^{j-1}b_0$ for all a and b where the MSB of $a_0$ is zero.

Where an ordering or hierarchy of the bits of $a_0$ is determined the further assumptions described above may be implemented for verifications of lower bits in the hierarchy. For example, if a hardware design for an integrated circuit that implements the dot product function $f$ shown in equation (20) where each element is a j-bit binary number, and the bits are placed in reverse numerical order then it may be verified that an instantiation of the hardware design has a constant first difference with respect to input element $a_0$ by:
1. Verifying that $F(a+2^{j-1}e_0, b)−F(a, b)=2^{j-1}b_0$ for all a and b where the MSB of $a_0$ is zero;
2. Verifying that $F(a+2^{j-2}e_0, b)−F(a, b)=2^{j-2}b_0$ for all a and b where the first two MSBs of $a_0$ are zero;
3. Verifying that $F(a+2^{j-3}e_0, b)−F(a, b)=2^{j-3}b_0$ for all a and b where the first three MSBs of $a_0$ are zero;
4. ...
5. Verifying that $F(a+e_0, b)−F(a, b)=b_0$ for all a and b where $a_0$=0;

Where verifying a hardware design for an integrated circuit that implements a dot product function comprises verifying the symmetry or permutation independence of the hardware design then, when the bitwise method is used to verify the constant first difference of the hardware design for a particular $a_i$ or $b_i$, further assumptions or restrictions can be made for the verification of the bits lower in the ordering or hierarchy. Specifically, the verification for a particular bit of the element $a_0$ may be performed under a constraint that any bit higher in the order than the particular bit is zero for all other elements of the one of the first input vector and the second input vector. These assumptions/restrictions can be made because if it is proved that all permutations of the input vectors a, b do not change the output then it is known that at any point the inputs can be reordered, and the output will not change. As such, it can be assumed that for all other $a_i$, the bits that have already been proven are zero.

For example, if a hardware design for an integrated circuit that implements the dot product function shown in equation (20) where each element is a j-bit binary number, and the bits are in reverse bit order then it may be verified that an instantiation of the hardware design has a constant first difference with respect to input element $a_0$ by:
1. Verifying that $F(a+2^{j-1}e_0, b)−F(a, b)=2^{j-1}b_0$ for all a and b where the MSB of $a_0$ is zero;
2. Verifying that $F(a+2^{j-2}e_0, b)−F(a, b)=2^{j-2}b_0$ for all a and b where the first two MSBs of $a_0$ are zero and the MSB of all other $a_i$ (i.e. i≠0) is zero;
3. Verifying that $F(a+2^{j-3}e_0, b)−F(a, b)=2^{j-3}b_0$ for all a and b where the first three MSBs of $a_0$ are zero and the first two MSB of all other $a_i$ (i.e. i≠0) are zero;
4. ...
5. Verifying that $F(a+e_0, b)−F(a, b)=b_0$ for all a and b where $a_0$=0 and the first n−1 MSBs of the other $a_i$ (i.e. i≠0) are zero.

Verifying a hardware design for an integrated circuit that implements a dot product function (e.g. the dot product function expressed in equation (20)) in this manner verifies that the hardware design generates an expected output for all input values. Specifically, let a' and b' denote the input vectors that it is desirable to know that an instantiation of the hardware design generates the expected output for. If it is verified that an instantiation of the hardware design generates the expected output (e.g. 0) when the input vector a is all zeros this means that the instantiation generates the correct result for (0, b'$_0$). If a has a high bit zero, increment it. This is safe since it is known from the constant difference verification that such an increment preserves correctness provided all the bits of $a_0$ are low, and all the bits of the other $a_i$ in positions above position 0 are low. If any other a'$_i$ has a high bit zero, permute it to the first position and perform the same increment. Now one of the other $a_i$ is non-zero, but only in bit zero, which is included in the verifications above, and then permute it back to its correct place. Continue this until all $a_i$ have a correct bit zero. Perform the same process on all the $a_i$ to get the correct values for all the high bits. In this way, one can move from (0, b'$_0$) to (a'$_i$, b'$_i$) in a manner which preserves the correctness of the output.

Combination with Permutation Technique

The method 100 of FIG. 1 for verifying a hardware design for an integrated circuit that implements a function that is polynomial in one or more input variables may be combined with the permutation technique described above for use in verifying a dot product to further reduce the input space over which block 104 is performed. For example, if it is verified that an instantiation of a hardware design F(x, y) is linear in x and it is verified that F(x, y)=F(y, x) (i.e. that F is permutation independent with respect to vector (x, y)) then F is also linear in y. The verification in block 104 can then be reduced to the case where x≤y. This only eliminates the case where x=1 and y=0, but for more variables there could be a significant improvement.

Signed Input Variable

The verification of a hardware design for an integrated circuit that implements a function that is polynomial of degree k in input variable x for a set X of values of x wherein the input variable (e.g. x) is signed (i.e. the input variable can take on a positive or negative values) may be simplified by instead of verifying a constant $k^{th}$ difference for all values of x in the set X of values of x, verifying the $k^{th}$ constant difference for positive values of x only or for negative values of x only, and then verifying that there is a predetermined relationship (e.g. local symmetry) between the output of the instantiation in response to corresponding positive and negative values of x. For example, where a hardware design is for an integrated circuit that implements a linear polynomial in x such that an instantiation of the hardware design F(x) is equal to ax+b, F(-x) will be as shown in equation (27). Therefore F(-x)+F(x)=2b. Accordingly, in this case the relationship between positive and negative values of x may be verified, for example, by verifying the property expressed in equation (28):

$$F(-x)=-ax+b \qquad (27)$$

$$F(-x)=2F(0)-F(x) \qquad (28)$$

In some cases, the relationship between positive and negative input values may be easier for a formal verification tool to verify than verifying a constant $k^{th}$ difference for all values of x in the set X of values of x.

Furthermore, verifying a predetermined relationship between positive and negative values of the input variable x may allow the number of values of x for which the expected output is verified in block 104 to be reduced in some cases. For example, the number of values of the input variable for which the expected output is verified can be reduced to $$\left\lceil \frac{k}{2} + 1 \right\rceil$$

provided that the values of x for which the expected output is verified include a consecutive set of values of x that start from zero (e.g. 0, 1, 2 . . . ).

Modulo Arithmetic

The method 100 of FIG. 1 can also be used to verify a hardware design for an integrated circuit that implements a function that is polynomial of order k modulo N in input variable x (i.e. that the $k^{th}$ difference is constant, modulo N) by slightly amending block 102 to check that the $k^{th}$ difference modulo N is constant. For example, instead of verifying the property expressed in equation (7) to verify that an instantiation of a hardware design has a constant first difference equation (29) may be verified to verify that an instantiation of a hardware design has a constant first difference modulo N:

$$(F(x+1)-F(x))\bmod N=(F(1)-F(0))\bmod N \forall x \in X \qquad (29)$$

However, when the constant $k^{th}$ difference modulo N is verified then in block 104 the k+1 values of x for which the expected output of an instantiation of the hardware design is verified are k+1 consecutive (modulo N) values of x.

The constant common difference technique can be applied to functions that are polynomial of order k modulo N because if the $k^{th}$ difference is constant, any consecutive k terms define what that difference is, and the starting point, so the values of all future terms must follow. This is true even when taken modulo N.

This technique can be applied for any value of N, although it has proven to work particularly well when N is a power of 2.

Exponential Functions

An exponential function $f$ is a function of the form shown in equation (30) wherein x is a variable and a is a constant called the base function:

$$f(x)=a^x \qquad (30)$$

A similar method to that described with respect to FIG. 1 can be used to verify a hardware design for an integrated circuit that implements a function that is exponential in an input variable. This is because instead of the outputs for consecutive input values in the set having an addition-based relationship (i.e. the output for one input value can be determined by adding a number to the output for the previous input value), the outputs for consecutive values have a multiplication-based relationship (i.e. the output for one input value can be determined by multiplying a number to the output for the previous input value).

Figure 2:
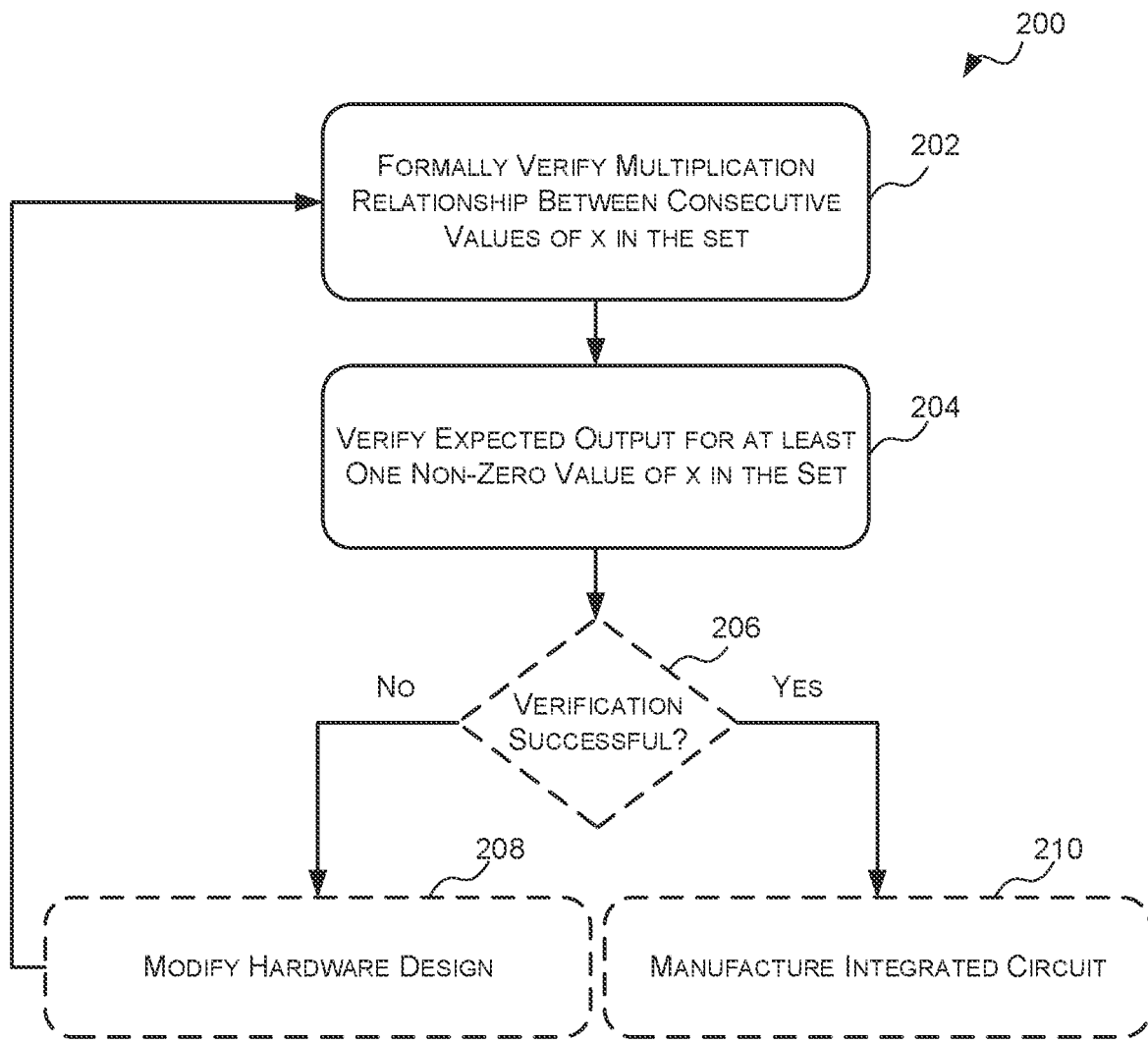
FIG. 2 is a flow diagram of an example method for verifying a hardware design for an integrated circuit that implements a function that is exponential in one or more input variables.

Reference is now made to FIG. 2 which illustrates an example method 200 for verifying a hardware design for an integrated circuit that implements a function that is exponential in an input variable x for a set of values of x. The method 200 may be implemented by a computing-based device such as, but not limited to, the computing-based device 400 described below with respect to FIG. 4. For example, there may be computer readable storage medium having stored thereon computer readable instructions that, when executed at a computing-based device, cause the computing-based device to perform the method 200 of FIG. 2.

The method 200 begins at block 202 where it is formally verified, using a formal verification tool, that an instantiation of the hardware design has a constant multiplication relationship between consecutive values of x in the set X of values of x. An instantiation of the hardware design is said to have a constant multiplication relationship between consecutive values of x if the output of the instantiation for x'+1 is equal to a constant times the output of the instantiation for x' (e.g. F(x+1)=F(x)*c for all x) when the set comprises a contiguous block of integers). Where the set of values of x are a contiguous block of integers comprising 1, verifying that an instantiation has a constant multiplication relationship between consecutive values of x may be verified, for example, by verifying that the output of an instantiation of the hardware design for a particular value of x (i.e. F(x)) multiplied by the output of the instantiation when x is 1 (i.e. F(1)), is equal to the output of the instantiation of the hardware design F for the next value of x (i.e F(x+1)) for all x in the set X as shown in equation (31):

$$F(x+1)=F(x)\times F(1) \qquad (31)$$

Formally verifying that an instantiation of a hardware design has a constant multiplication relationship between consecutive values of x in the set X of values may comprise generating one or more assertions to be verified, linking the one or more assertions to the hardware design, and formally verifying, using a formal verification tool, that the one or more assertions are true (or hold) for the hardware design, and outputting one or more signals indicating whether the one or more assertions were successfully verified.

Once the formal verification is complete the method 200 proceeds to block 204.

At block 204, it is verified that an instantiation of the hardware design generates an expected output for at least one non-zero value of x in the set X of values of x (i.e. x≠0).

The verification that an instantiation of the hardware design generates an expected output for at least one non-zero value of x in the set X may be verified via simulation based verification or via formal verification. For example, a set of one or more assertions may be developed, which if verified to be true for the hardware design, establish that an instantiation of the hardware design generates an expected output for at least one non-zero value of x; and the one or more assertions may be formally verified by a formal verification tool. Alternatively, at least one non-zero value of x may be provided to an instantiation of the hardware design as input via simulation and the output compared to the expected output.

Where the method 200 is used to verify that an instantiation of the hardware design will produce the correct output then it is verified that an instantiation of the hardware design produces the correct output in response to a single value of x other than x=0 according to the function. Where the method 200 is used to verify the functional equivalence of the hardware design with another hardware design then the multiplication relationship between consecutive values of x is also verified (e.g. the property set out in equation (31) is verified) for the other hardware design and then the functional equivalence of the two designs is verified for at least one value of x other than x=0.

Once the expected output verification is complete the method 200 may end or the method 200 may proceed to block 206.

At block 206, a determination is made as to whether the verification of the hardware design was successful (i.e. the verifications in blocks 202 and 204 were successful). As described above, when a formal verification tool is used to verify an assertion for a hardware design, the formal verification tool may output a signal or a set of signals that indicates whether or not the assertion is valid (i.e. the asserted property is true for all valid states or sequence of states). Where block 204 is performed via simulation based verification the simulation tool used to perform the verification may also output one or more signals that indicate whether or not the verification was successful. In these cases, the determination as to whether the verification was successful may be based on the output signal(s).

If it is determined that the verification was successful (indicating that the instantiation of the hardware design is working as expected) the method 200 may proceed to block 210 where an integrated circuit described by the hardware design is manufactured. If, however, it is determined that the verification of the hardware design was not successful (indicating that there is an error in the hardware design) then the method 200 may proceed to block 208 where the hardware design is modified to correct the error in the hardware design that caused the unexpected behaviour. As described above, when the verification of an assertion is not successful the formal verification tool may output information indicating a state or sequence of states of an instantiation of the hardware design which cause the assertion to fail. In these cases, the modification may be based on the information indicating the state or sequence of states which cause the assertion to fail (e.g. a counter-example). Once the hardware design has been modified the modified hardware design may be re-verified (e.g. blocks 202-210 may be repeated for the modified hardware design).

Although blocks 202 and 204 are shown in FIG. 2 as being executed sequentially it will be evident to a person of skill in the art that this is an example only and that in other examples blocks 202 and 204 may be executed in the reverse order (i.e. block 204 may be executed before block 202) or they may be executed concurrently.

Similar to the verification of a hardware design for an integrated circuit that implements a function that is polynomial in one or more input variables, if the function that is exponential in an input variable has one or more other input variables then block 202 is performed for each value of the other input variables.

System

Figure 3:
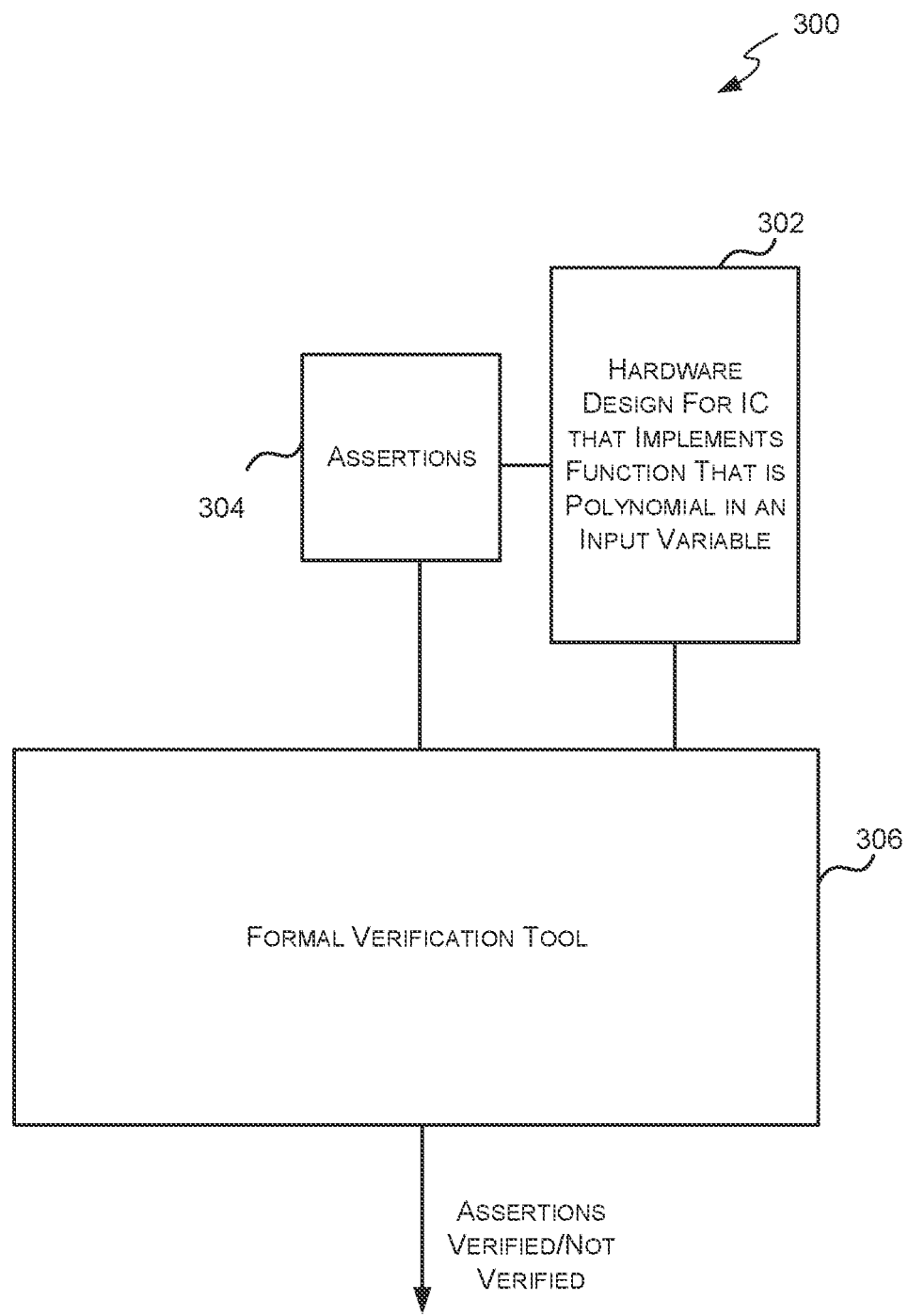
FIG. 3 is a block diagram of an example system for verifying a hardware design for an integrated circuit that implements a function that is polynomial in one or more input variables in accordance with the method of FIG. 1.

Reference is now made to FIG. 3 which illustrates a first example system 300 for verifying a hardware design for an integrated circuit that implements a function that is polynomial in an input variable. The system 300 may be implemented by one or more computing-based devices, such as the computing-based device 400 described below with respect to FIG. 4. For example, one or more of the components of the system 300 of FIG. 3 may be implemented as computer readable instructions, which when executed by a computing-based device, cause the computing-based device to perform the functions of the component described below.

The system 300 comprises a hardware design 302 for an integrated circuit that implements a function that is polynomial in an input variable x for a set X of values of x; one or more formal assertions 304; and a formal verification tool 306.

As described above, a hardware design for an integrated circuit is a description of the structure and/or functionality of an integrated circuit which, when processed at an integrated circuit manufacturing system, causes the integrated circuit manufacturing system to generate an integrated circuit described by the hardware design. A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used, such as, but not limited to, proprietary high-level hardware description languages. Accordingly the hardware design 302 of FIG. 3 is a description of the structure and/or function of an integrated circuit to implement a function that is polynomial in an input variable x for a set X of values of x.

As described above, an assertion is a statement that a particular property is expected to hold for the hardware design (i.e. is always true). The one or more assertions 304 comprise one or more assertions, which if verified to be true for the hardware design 302 verify that an instantiation of the design implements a function that has a constant $k^{th}$ difference for all values of x in the set X and thus the instantiation of the design implements a function that is polynomial of degree k for all values of x in the set X. These assertions may be configured to verify that an instantiation of the hardware design has a constant $k^{th}$ difference for all values of x in the set X of values using any of the methods, techniques and/or properties described above. For example, the one or more assertions may be configured to verify the properties described in any of equations (5), (7), (8), (11), (12), (13), (14), (15), (16), (17), (18), (19) and (26). An example assertion which may be used to verify that a hardware design has a constant first difference was described above.

In some cases, the one or more assertions 304 may also comprise one or more assertions, which if verified to be true for the hardware design verify that the hardware design generates an expected output in response to at least k (if the constant $k^{th}$ difference is predetermined) or at least k+1 (if the constant $k^{th}$ difference is not predetermined) values of x in the set X.

In other cases, the expected output for k or k+1 values of x in the set X is verified by simulation-based verification. Specifically, k or k+1 different values of x may be provided to an instantiation of the hardware design via a simulation engine (not shown) as input and the output compared to the expected output. As is known to those of skill in the art a simulation engine monitors the output of an instantiation of a hardware design in response to each input in a range of inputs to determine if a property is met. A simulation engine may perform the simulation-based verification using any known method. For example, the simulation engine may receive the hardware design in, for example HDL, convert the HDL to another language, such as C, and perform the simulation on the C code; the simulation engine may receive the hardware design as, for example, HDL and perform the simulation directly on the HDL; or the simulation engine may implement the hardware design in hardware and perform the simulation on the hardware.

In either case, where the system 300 is being using to verify the correctness of the output, verifying that an instantiation of the hardware design generates an expected output for k or k+1 different values of x in the set X comprises verifying that an instantiation of the hardware design generates the correct output for k or k+1 different values of x in the set X according to the function. The verification that an instantiation of the hardware design generates the correct output for k or k+1 different values of x in the set X may be performed by comparing the output of the instantiation of the hardware design to values in a look-up table that represent the correct output or by comparing the output of the instantiation to an output of a higher level model of the design or function, such as, but not limited to a C model of the hardware design or function.

In contrast, where the system 300 is used to verify the functional equivalence of the hardware design and another hardware design for an integrated circuit that implements a function that is polynomial of degree k in x for the set X of values of x, verifying that an instantiation of the hardware design generates an expected output for k or k+1 different values of x in the set X of values of x may comprise verifying the functional equivalence of the hardware design and the other hardware design for k or k+1 different values of x in the set X. Verifying the functional equivalence of the hardware design and the other hardware design for k+1 different values of x may comprise verifying that in response to k or k+1 different values of x in the set X instantiations of the two hardware designs generate the same output as each other. In these cases, the one or more assertions also comprises one or more assertions, which if verified to be true for the other hardware design, verifies that an instantiation of the hardware design has a constant $k^{th}$ difference with respect to x for the values of x in the set X and thus implements a polynomial of degree k in x for the set X of values of x.

Depending on the function that is implemented by the integrated circuit, the one or more assertions may further comprise one or more other assertions to verify one or more other properties. For example, where the function implemented by the integrated circuit is a dot product function between first and second input vectors wherein each input vector comprises a plurality of elements, the one or more assertions may also comprise one or more assertions, which if verified to be true for the hardware design, establish that an instantiation of the hardware design is permutation independent for one or more permutations of the input elements of the input vectors and/or the input vectors themselves. In another example, where the function implemented by the integrated circuit is also polynomial in another input variable z then the one or more assertions may also comprise one or more assertions, which if verified to be true for the hardware design, establish that an instantiation of the hardware design has a constant $q^{th}$ difference with respect to the other input variable z. It will be evident to a person of skill in the art that these are examples only and the one or more assertions may comprise one or more assertions to verify any of the properties described above.

The one or more assertions 304 are linked to the hardware design so that the one or more assertions are connected to the relevant signals of the hardware design so as to be able to evaluate the asserted property/properties. As described above, the one or more assertions may be linked to the hardware design by binding the one or more assertions 304 to the hardware design or embedding the one or more assertions in the hardware design.

As described above, the formal verification tool 306 is a software tool that is capable of performing formal verification of a hardware design.

The hardware design 302, the one or more assertions 304, and the bindings (if any) are loaded in the formal verification tool 306. The formal verification tool 306 is then configured to formally verify the one or more assertions are true for the hardware design.

When the formal verification tool 306 is used to verify an assertion, the formal verification tool 306 may output an indication of whether or not the assertion is valid (i.e. the asserted property is true for all valid states or sequence of states), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 306 has run out of memory or because the formal verification tool 306 has determined that a certain amount of progress has not been made after a predefined period of time.

When an assertion is not valid or has not been successfully verified, the formal verification tool 306 may also output information indicating a state or sequence of states of the hardware design which causes the assertion to fail (e.g. a counter-example). For example, the formal verification tool 306 may output a trace of the verification indicating at what point, state or sequence of states the failure occurred.

It will be evident to a person of skill in the art that a system similar to system 300 of FIG. 3 may be used to verify a hardware design for an integrated circuit that implements a function that is exponential in an input variable.

Figure 4:
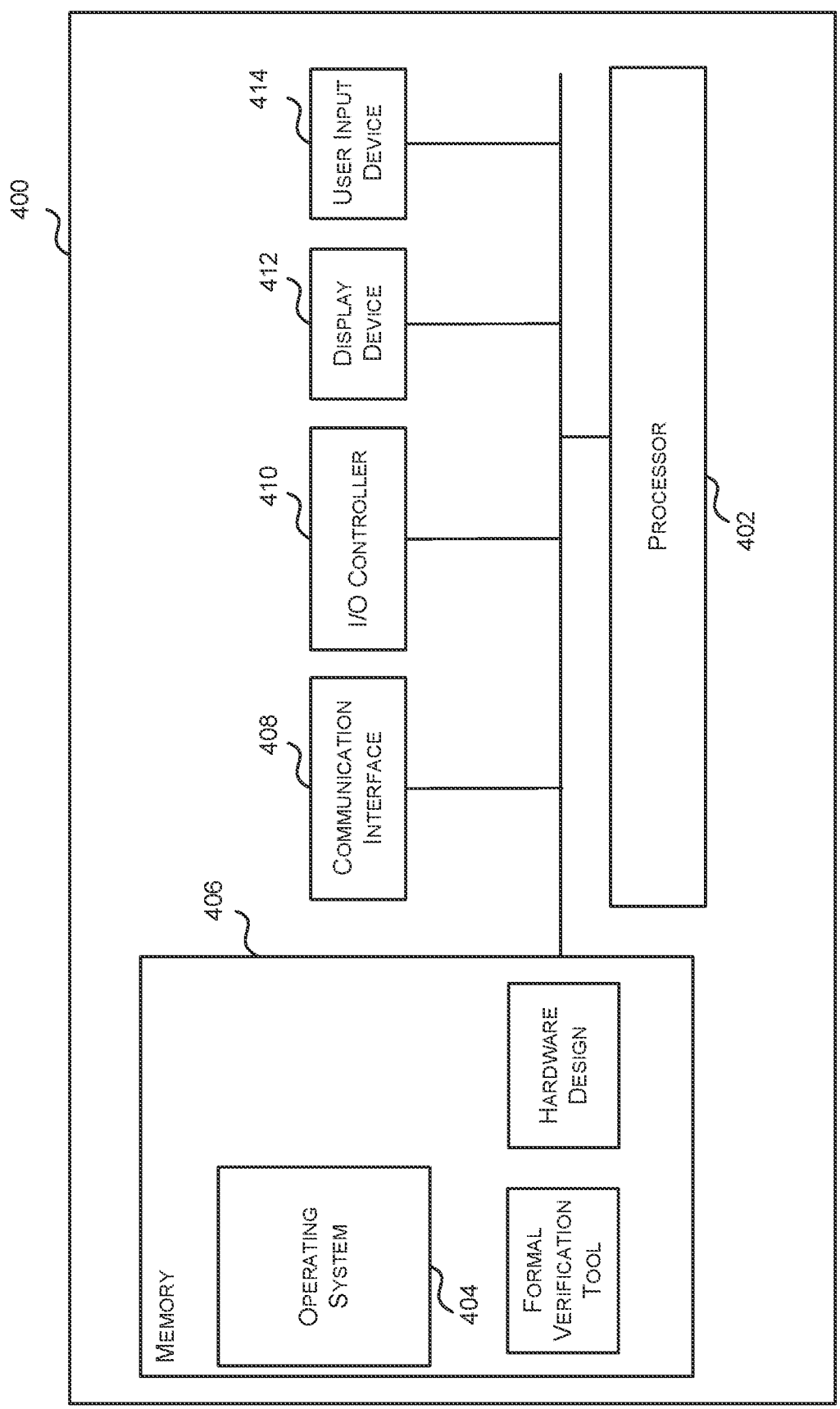
FIG. 4 is a block diagram of an example computing-based device.

FIG. 4 illustrates various components of an exemplary computing-based device 400 which may be implemented as any form of a computing and/or electronic device, and in which embodiments of the methods and systems described herein may be implemented.

Computing-based device 400 comprises one or more processors 402 which may be microprocessors, controllers or any other suitable type of processors for processing computer executable instructions to control the operation of the device in order to verify a hardware design for an integrated circuit that implements a function that is polynomial in an input variable or verify a hardware design for an integrated circuit that implements a function that is exponential in an input variable. In some examples, for example where a system on a chip architecture is used, the processors 402 may include one or more fixed function blocks (also referred to as accelerators) which implement a part of the method of verifying a hardware design for an integrated circuit that implements a function that is polynomial in an input variable or a part of the method of verifying a hardware design for an integrated circuit that implements a function that is exponential in an input variable, in hardware (rather than software or firmware). Platform software comprising an operating system 404 or any other suitable platform software may be provided at the computing-based device to enable application software, such as a formal verification tool, to be executed on the device.

The computer executable instructions may be provided using any computer-readable media that is accessible by computing-based device 400. Computer-readable media may include, for example, computer storage media such as memory 406 and communications media. Computer storage media (i.e. non-transitory machine-readable media), such as memory 406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine-readable media, e.g. memory 406) is shown within the computing-based device 400 it will be appreciated that the storage may be distributed or located remotely and accessed via a network or other communication link (e.g. using communication interface 408).

The computing-based device 400 also comprises an input/output controller 410 arranged to output display information to a display device 412 which may be separate from or integral to the computing-based device 400. The display information may provide a graphical user interface. The input/output controller 410 is also arranged to receive and process input from one or more devices, such as a user input device 414 (e.g. a mouse or a keyboard). This user input may be used to initiate verification. In an embodiment the display device 412 may also act as the user input device 414 if it is a touch sensitive display device. The input/output controller 410 may also output data to devices other than the display device, e.g. a locally connected printing device (not shown in FIG. 4).

Figure 5:
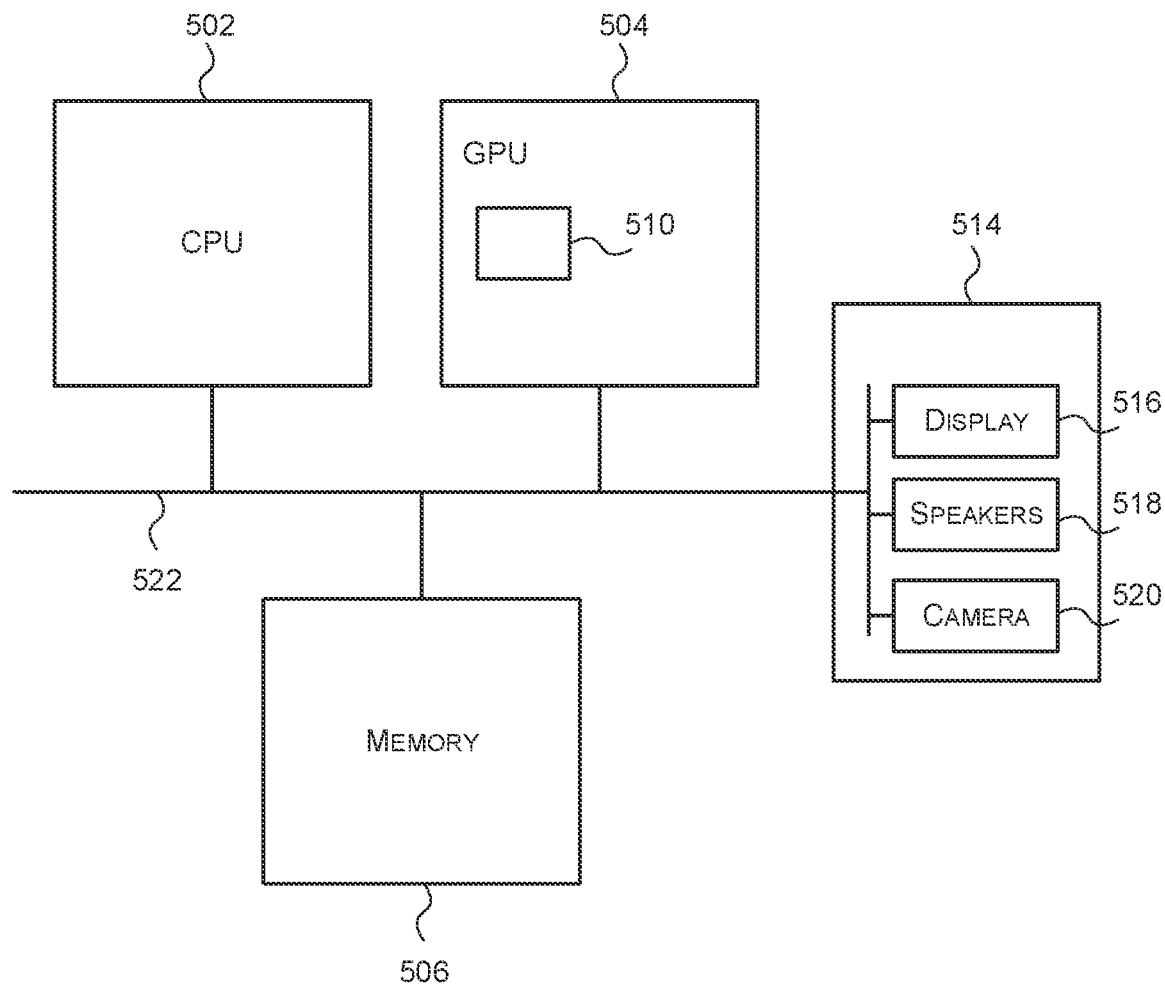
FIG. 5 is a block diagram of an example computer system in which an integrated circuit that implements a function that is polynomial in one or more input variables and/or an integrated circuit that implements a function that is exponential in one or more input variables may be implemented.

FIG. 5 shows a computer system in which an integrated circuit that implements a function that is polynomial in an input variable and/or an integrated circuit that implements a function that is exponential in input variable may be implemented. The computer system comprises a CPU 502, a GPU 504, a memory 506 and other devices 514, such as a display 516, speakers 518 and a camera 520. An integrated circuit 510 that implements a function that is polynomial in one or more input variables or a function that is exponential in one or more input variables is implemented on the GPU 504. In other examples, the integrated circuit 510 that implements a function that is polynomial in one or more input variables or a function that is exponential in one or more input variables 60 may be implemented on the CPU 502. The components of the computer system can communicate with each other via a communications bus 522.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (e.g. hardware design) that when processed (i.e. run) in an integrated circuit manufacturing system configures the system to manufacture a device (e.g. processor or other computing-based device) comprising any apparatus (e.g. an integrated circuit that implements a function that is polynomial in an input variable or an integrated circuit that implements a function the is exponential in an input variable) described herein. An integrated circuit definition dataset may be, for example, an integrated circuit description.

Therefore, there may be provided a method of manufacturing, at an integrated circuit manufacturing system, an integrated circuit that implements a function that is polynomial in an input variable or a function that is exponential in an input variable. Furthermore, there may be provided an integrated circuit definition dataset (e.g. hardware design) that, when processed in an integrated circuit manufacturing system, causes the method of manufacturing an integrated circuit that implements a function that is polynomial in an input variable or a function that is exponential in an input variable to be performed.

An integrated circuit definition dataset (e.g. hardware design) may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. hardware design) at an integrated circuit manufacturing system so as to configure the system to manufacture an integrated circuit that implements a function that is polynomial in an input variable or a function that is exponential in an input variable will now be described with respect to FIG. 6.

Figure 6:
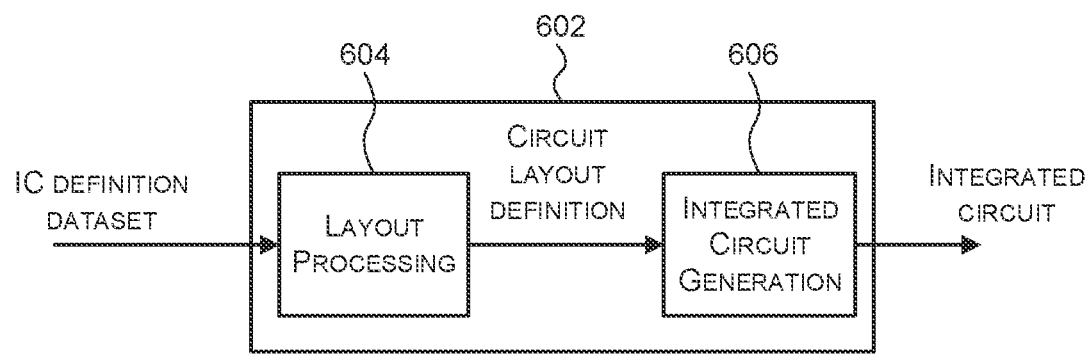
FIG. 6 is a block diagram of an example integrated circuit manufacturing system which may be used to generate an integrated circuit that implements a function that is polynomial in one or more input variables or an integrated circuit that implements a function that is exponential in one or more input variables.

FIG. 6 shows an example of an integrated circuit (IC) manufacturing system 602 which is configured to manufacture an integrated circuit that implements a function that is polynomial in an input variable or a function that is exponential in an input variable. In particular, the IC manufacturing system 602 comprises a layout processing system 604 and an integrated circuit generation system 606. The IC manufacturing system 602 is configured to receive an IC definition dataset, such as a hardware design, (e.g. defining an integrated circuit that implements a function that is polynomial in an input variable or a function that is exponential in an input variable as described in any of the examples herein), process the IC definition dataset, and generate an IC according to the IC definition dataset. The processing of the IC definition dataset configures the IC manufacturing system 602 to manufacture an integrated circuit that implements the function as described in any of the examples herein.

The layout processing system 604 is configured to receive and process the IC definition dataset (e.g. hardware design) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit that implements a function that is polynomial in an input variable or a function that is exponential in an input variable without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Aspects of the invention are disclosed in the following numbered clauses:

Clause 1. A computer-implemented method 100 of verifying a hardware design for an integrated circuit that implements a function that is polynomial of degree k in an input variable x over a set of values of x, the set of values of x comprising equally spaced values of x, k being an integer greater than or equal to one, the method 100 comprising in one or more processors: formally verifying that a first instantiation of the hardware design implements a function that is polynomial of degree k in x by formally verifying that for all values of x in the set of values of x the first instantiation of the hardware design has a constant $k^{th}$ difference 102; and verifying that a second instantiation of the hardware design generates an expected output in response to each of at least e different values of x in the set of values of x 104, wherein e is equal to k when a value of the $k^{th}$ difference is predetermined and e is equal to k+1 when the value of the $k^{th}$ difference is not predetermined.

Clause 2. The method 100 of clause 1, wherein the set of values of x comprises a contiguous block of integers, and formally verifying that for all values of x in the set of values of x the first instantiation of the hardware design has a constant $k^{th}$ difference comprises formally verifying that the first instantiation of the hardware design P satisfies:

$$\sum_{i=0}^{k} \binom{k}{i}(-1)^i P(x+i) = c$$

for all values of x in the set of values of x wherein c is a constant.

Claus 3. The method 100 of clause 1 or clause 2, wherein when k is one, formally verifying that for all x in the set of values of x the first instantiation of the hardware design has a constant $k^{th}$ difference comprises formally verifying that a difference in outputs of the first instantiation in response to any two consecutive values of x in the set of values of x is constant.

Clause 4. The method 100 of any of clauses 1 to 3, wherein verifying that the second instantiation of the hardware design generates an expected output in response to each of at least e different values of x in the set of values of x comprises verifying that the second instantiation of the hardware design generates a correct output in response to each of at least e different values of x in the set of values of x according to the function.

Clause 5. The method 100 of any of clauses 1 to 3, wherein verifying that the second instantiation of the hardware design generates an expected output in response to each of at least e different values of x in the set of values of x comprises verifying a functional equivalence of the second instantiation of the hardware design and an instantiation of another hardware design for at least e different values of x in the set of values of x wherein the other hardware design is for an integrated circuit that implements a function that is polynomial of degree k in x for all x in the set of values of x; and the method 100 further comprises formally verifying that for all x in the set of values of x the instantiation of the other hardware design has a constant $k^{th}$ difference.

Clause 6. The method 100 of clause 5, wherein verifying the functional equivalence of the second instantiation of the hardware design and the instantiation of the other hardware design for at least e different values of x in the set of values of x comprises verifying that for each of the at least e different values of x in the set of values of x the second instantiation of the hardware design and the instantiation of the other hardware design generate a same output as each other.

Clause 7. The method 100 of any of clauses 1 to 6, wherein the function is also polynomial of degree r in x over a second set of values of x and the method further comprises: formally verifying that a third instantiation of the hardware design implements a function that is polynomial of degree r in x by formally verifying that for all x in the second set of values of x the third instantiation of the hardware design has a constant $r^{th}$ difference; and verifying that a fourth instantiation of the hardware design generates an expected output in response to each of r+1 different values of x in the second set of values of x.

Clause 8. The method 100 of clause 7, wherein the polynomial in x over the set of values of x is different from the polynomial in x over the second set of values of x.

Clause 9. The method 100 of any of clauses 1 to 8, wherein: the function is also polynomial in a second input variable z over a set of values of z; the method 100 further comprises formally verifying that a fifth instantiation of the hardware design implements a function that is polynomial of degree q in z by formally verifying that for all values of z in the set of values of z the fifth instantiation of the hardware design has a constant $q^{th}$ difference; and the verification that the second instantiation of the hardware design generates an expected output in response to each of at least e different values of x in the set of values of x is performed for at least q different values of z.

Clause 10. The method 100 of clause 9, wherein the input variable x and the second input variable z are ordered and the verification that an instantiation of the hardware design has a constant difference for the lower ordered input variable is performed under a constraint that the higher ordered input variable is restricted to at least k or at least q values of that input variable.

Clause 11. The method 100 of any of clauses 1 to 10, wherein: the function has at least one additional input variable; the formal verification that for all values of x in the set of values of x the first instantiation of the hardware design has a constant $k^{th}$ difference is performed for each valid value of each of the at least one additional input variable; and the verification that the second instantiation of the hardware design generates an expected output in response to each of at least e different values of x in the set of values of x is performed for each valid value of each of the at least one additional input variable.

Clause 12. The method 100 of any of clauses 1 to 11, wherein the input variable x is a multiple bit binary number and formally verifying that for all values of x in the set of values of x the first instantiation of the hardware design has a constant $k^{th}$ difference comprises verifying the constant $k^{th}$ difference separately for each bit of the input variable x.

Clause 13. The method 100 of any preceding claim, wherein: the input variable x is a multiple bit binary number; k is equal to one; the constant $k^{th}$ difference is c; and verifying that the first instantiation of the hardware design has a constant $k^{th}$ difference comprises verifying for each bit i of the input variable x that the difference in the outputs of the first instantiation of the hardware design in response to a first value of x and a second value of x is equal to $2^{i}*c$ wherein the $i^{th}$ least significant bit of the first value of x is one and the $i^{th}$ least significant bit of the second value of x is zero and all other bits of the first value of x and the second value of x are the same.

Clause 14. The method 100 of clause 13, wherein the bits of the input variable x are ordered and the verification for a particular bit of the input variable x is performed under a constraint that any bit higher in the order than the particular bit is zero for the first and second values of x.

Clause 15. The method 100 of any of clauses 1 to 14, wherein the function is a dot product of a first input vector comprising a plurality of elements and a second input vector comprising a plurality of elements and the input variable x is one of the elements of one of the first input vector and the second input vector and the method further comprises formally verifying that a sixth instantiation of the hardware design is permutation independent with respect to the elements of the first and second input vectors.

Clause 16. The method 100 of clause 15, when in combination with clause 13 and claim 14, wherein: each of the elements of the first and second input vectors is a multi-bit binary number; the bits of the input variable x are ordered; and the verification of the constant $k^{th}$ difference for a particular bit of the input variable x is performed under a constraint that any bit higher in the order than the particular bit is zero for all other elements of the one of the first input vector and the second input vector.

Clause 17. The method 100 of any of clauses 1 to 16, wherein the function is polynomial mod N in the input variable x and formally verifying that for all x in the set of values of x the first instantiation of the hardware design has a constant $k^{th}$ difference comprises formally verifying that for all x in the set of values of x the first instantiation of the hardware design has a constant $k^{th}$ difference mod N, wherein N is an integer greater than 1.

Clause 18. The method 100 of any of clauses 1 to 17, wherein formally verifying that for all x in the set of values of x the first instantiation of the hardware design has a constant $k^{th}$ difference comprising generating one or more assertions that if verified to be true establish that for all x in the set of values of x the first instantiation of the hardware design has a constant $k^{th}$ difference, and formally verifying the one or more assertions are true for the hardware design using a formal verification tool.

Clause 19. A computer-implemented method 200 of verifying a hardware design for an integrated circuit that implements a function that is exponential in an input variable x over a set of values of x, the method 200 comprising in one or more processors: formally verifying that a first instantiation of the hardware design has a constant multiplication relationship between consecutive values of x in the set of values of x 202; and verifying that a second instantiation of the hardware design generates an expected output for at least one non-zero value of x in the set of values of x 204.

Clause 20. The method 200 of clause 19, wherein the first instantiation of the hardware design has a constant multiplication relationship between consecutive values of x in the set of values of x if for any value of x in the set of values of x an output of the first instantiation of the hardware design when x has that value multiplied by a constant is equal to the output of the first instantiation of the hardware design when x has a next highest value in the set from that value.

Clause 21. The method 200 of clause 19 or clause 20, wherein the set of values of x comprises a contiguous set of integers including the value one, and formally verifying that a first instantiation of the hardware design has a constant multiplication relationship between consecutive values of x in the set of values of x comprises verifying that an output of the first instantiation of the hardware design when x is any value in the set multiplied by an output of the first instantiation when x is equal to one is equal to an output of the first instantiation of the hardware design when x has a next value in the set from that value.

Clause 22. The method 200 of any of clause 19 to 21, wherein verifying that the second instantiation of the hardware design generates an expected output for at least one non-zero value of x in the set of values of x comprises verifying that the second instantiation of the hardware design generates a correct output for at least one non-zero value of x in the set of values of x according to the function.

Clause 23. The method 200 of any of clauses 19 to 21, wherein verifying that the second instantiation of the hardware design generates an expected output in response to at least one non-zero value of x in the set of values of x comprises verifying a functional equivalence of the second instantiation of the hardware design and an instantiation of another hardware design for at least one non-zero value of x wherein the other hardware design is for an integrated circuit that implements a function that is exponential in x for all values of x in the set of values of x; and the method 200 further comprises formally verifying that an instantiation of the other hardware design has a constant multiplication relationship between consecutive values of x in the set of values of x.

Clause 24. The method 100, 200 of any of clauses 1 to 23, further comprising outputting one or more signals indicating whether the formal verification and/or the verification was successful.

Clause 25. The method 100, 200 of any of clauses 1 to 24, further comprising, in response to determining that the formal verification or the verification was not successful 106, 206, modifying the hardware design to generate a modified hardware design 108, 208.

Clause 26. The method 100, 200 of clause 25, further comprising repeating the formal verification and the verification for the modified hardware design.

Clause 27. The method 100, 200 of any of clauses 1 to 26, further comprising, in response to determining that the formal verification and the verification was successful 106, 206, manufacturing, using an integrated circuit manufacturing system, the integrated circuit according to the hardware design 110, 210.

Clause 28. The method 100, 200 of clause 27, wherein manufacturing, using an integrated circuit manufacturing system, the integrated circuit according to the hardware design comprises: processing, using a layout processing system, the hardware design so as to generate a circuit layout description of the integrated circuit; and manufacturing, using an integrated circuit generation system, the integrated circuit according to the circuit layout description.

Clause 29. The method 100, 200 of any of clauses 1 to 28, wherein, when processed in an integrated circuit manufacturing system, the hardware design configures the integrated circuit manufacturing system to manufacture the integrated circuit.

Clause 30. A system 300 for verifying a hardware design for an integrated circuit that implements a function that is polynomial of degree k in an input variable x over a set of values of x, the set of values of x comprising equally spaced values of x, k being an integer greater than or equal to one the system 300 comprising: memory configured to store: the hardware design 302; and one or more verification tools comprising at least one formal verification tool 306; and one or more processors configured to: formally verify, using the at least one formal verification tool 306, that a first instantiation of the hardware design implements a function that is polynomial of degree k in x by formally verifying that for all x in the set of values of x the first instantiation of the hardware design has a constant $k^{th}$ difference; and verify, using one of the one or more verification tools, that a second instantiation of the hardware design generates an expected output in response to each of at least e different values of x in the set of values of x, wherein e is equal to k when a value of the $k^{th}$ difference is predetermined and e is equal to k+1 when the value of the $k^{th}$ difference is not predetermined.

Clause 31. A system for verifying a hardware design for an integrated circuit that implements a function that is exponential in an input variable x over a set of values of x, the system comprising: memory configured to store: the hardware design; and one or more verification tools comprising at least one formal verification tool; and one or more processors configured to: formally verify, using the at least one formal verification tool, that a first instantiation of the hardware design has a constant multiplication relationship between consecutive values of x in the set of values of x; and verify, using one of the one or more verification tools, that a second instantiation of the hardware design generates an expected output for at least one non-zero value of x in the set of values of x.

Clause 32. Computer readable code configured to cause the method 100, 200 of any of clauses 1 to 29 to be performed when the code is run.

Clause 33. A computer readable storage medium having encoded thereon the computer readable code of clause 32.

Clause 34. A method of manufacturing an integrated circuit, using an integrated circuit manufacturing system, the method comprising: verifying a hardware design for the integrated circuit according to the method of any of clauses 1 to 26; processing, using a layout processing system, the hardware design so as to generate a circuit layout description of the integrated circuit; and manufacturing, using an integrated circuit generation system, the integrated circuit according to the circuit layout description.

What is claimed is:

1. A computer-implemented method of verifying a hardware design for an integrated circuit that implements a function that is exponential in an input variable x over a set of values of x, the method comprising, in one or more processors:

formally verifying that a first instantiation of the hardware design has a constant multiplication relationship between consecutive values of x in the set of values of x; and verifying that a second instantiation of the hardware design generates an expected output for at least one non-zero value of x in the set of values of x.

2. The method of claim 1, wherein the first instantiation of the hardware design has a constant multiplication relationship between consecutive values of x in the set of values of x if, for any value of x in the set of values of x, an output of the first instantiation of the hardware design when x has that value, multiplied by a constant, is equal to the output of the first instantiation of the hardware design when x has a next highest value in the set from that value.

3. The method of claim 1, wherein the set of values of x comprises a contiguous set of integers including the value one, and formally verifying that the first instantiation of the hardware design has a constant multiplication relationship between consecutive values of x in the set of values of x comprises verifying that an output of the first instantiation of the hardware design when x is any value in the set, multiplied by an output of the first instantiation of the hardware design when x is equal to one, is equal to an output of the first instantiation of the hardware design when x has a next value in the set from that value.

4. The method of claim 1, wherein verifying that the second instantiation of the hardware design generates an expected output for at least one non-zero value of x in the set of values of x comprises verifying that the second instantiation of the hardware design generates a correct output for at least one non-zero value of x in the set of values of x according to the function.

5. The method of claim 1, wherein verifying that the second instantiation of the hardware design generates an expected output for at least one non-zero value of x comprises verifying a functional equivalence of the second instantiation of the hardware design and an instantiation of another hardware design for at least one non-zero value of x wherein the other hardware design is for an integrated circuit that implements a function that is exponential in x for all values of x in the set of values of x; and further comprising formally verifying that an instantiation of the other hardware design has a constant multiplication relationship between consecutive values of x in the set of values of x.

6. The method of claim 1, further comprising outputting one or more signals indicating whether the formal verification and/or the verification was successful.

7. The method of claim 1, further comprising, in response to determining that the formal verification or the verification was not successful, modifying the hardware design to generate a modified hardware design.

8. The method of claim 7, further comprising repeating the formal verification and the verification for the modified hardware design.

9. The method of claim 1, further comprising, in response to determining that the formal verification and the verification were successful, manufacturing, using an integrated circuit manufacturing system, the integrated circuit according to the hardware design.

10. The method of claim 9, wherein manufacturing, using an integrated circuit manufacturing system, the integrated circuit according to the hardware design comprises:

processing, using a layout processing system, the hardware design so as to generate a circuit layout description of the integrated circuit; and manufacturing, using an integrated circuit generation system, the integrated circuit according to the circuit layout description.

11. The method of claim 1, wherein, when processed in an integrated circuit manufacturing system, the hardware design configures the integrated circuit manufacturing system to manufacture the integrated circuit.

12. A system for verifying a hardware design for an integrated circuit that implements a function that is exponential in an input variable x over a set of values of x, the system comprising:
 memory configured to store:
  the hardware design; and
  one or more verification tools comprising at least one formal verification tool; and
 one or more processors configured to:
  formally verify, using the at least one formal verification tool, that a first instantiation of the hardware design has a constant multiplication relationship between consecutive values of x in the set of values of x; and
  verifying, using one of the one or more verification tools, that a second instantiation of the hardware design generates an expected output for at least one non-zero value of x in the set of values of x.

13. The system of claim 12, wherein the first instantiation of the hardware design has a constant multiplication relationship between consecutive values of x in the set of values of x if, for any value of x in the set of values of x, an output of the first instantiation of the hardware design when x has that value, multiplied by a constant, is equal to the output of the first instantiation of the hardware design when x has a next highest value in the set from that value.

14. The system of claim 12, wherein the set of values of x comprises a contiguous set of integers including the value one, and the one or more processors are configured to formally verify that the first instantiation of the hardware design has a constant multiplication relationship between consecutive values of x in the set of values of x by verifying that an output of the first instantiation of the hardware design when x is any value in the set, multiplied by an output of the first instantiation of the hardware design when x is equal to one, is equal to an output of the first instantiation of the hardware design when x has a next value in the set from that value.

15. The system of claim 12, wherein the one or more processors are configured to verify that the second instantiation of the hardware design generates an expected output for at least one non-zero value of x in the set of values of x by verifying that the second instantiation of the hardware design generates a correct output for at least one non-zero value of x in the set of values of x according to the function.

16. The system of claim 12, wherein the one or more processors are configured to verify that the second instantiation of the hardware design generates an expected output in response to at least one non-zero value of x by verifying a functional equivalence of the second instantiation of the hardware design and an instantiation of another hardware design for at least one non-zero value of x wherein the other hardware design is for an integrated circuit that implements a function that is exponential in x for all values of x in the set of values of x; and
 the one or more processors are further configured to formally verify that an instantiation of the other hardware design has a constant multiplication relationship between consecutive values of x in the set of values of x.

17. A non-transitory computer readable storage medium having stored thereon computer readable instructions that, when executed at a computer system, cause the computer system to perform the method as set forth in claim 1.

* * * * *

UNITED STATES PATENT AND TRADEMARK OFFICE
CERTIFICATE OF CORRECTION

| | | |
|---|---|---|
| PATENT NO. | : 11,763,054 B2 | |
| APPLICATION NO. | : 17/384483 | |
| DATED | : September 19, 2023 | |
| INVENTOR(S) | : Sam Elliott et al. | |

It is certified that error appears in the above-identified patent and that said Letters Patent is hereby corrected as shown below:

On the Title Page

Item (72) Inventors:, please replace:
Robert McKerney
With:
-- Robert McKemey --

Signed and Sealed this
Thirtieth Day of January, 2024

Katherine Kelly Vidal
*Director of the United States Patent and Trademark Office*